US008379689B2

(12) United States Patent
Michaels et al.

(10) Patent No.: US 8,379,689 B2
(45) Date of Patent: *Feb. 19, 2013

(54) ANTI-JAM COMMUNICATIONS HAVING SELECTIVELY VARIABLE PEAK-TO-AVERAGE POWER RATIO INCLUDING A CHAOTIC CONSTANT AMPLITUDE ZERO AUTOCORRELATION WAVEFORM

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 719 days.

This patent is subject to a terminal disclaimer.

(21) Appl. No.: 12/496,214

(22) Filed: Jul. 1, 2009

(65) Prior Publication Data

US 2011/0002364 A1 Jan. 6, 2011

(51) Int. Cl.
*H04B 1/00* (2006.01)
(52) U.S. Cl. ...................................................... 375/142
(58) Field of Classification Search .................. 375/130, 375/132, 140, 141, 142, 146, 147, 148, 150, 375/260, 267, 326, 344; 370/328, 329, 335, 370/342, 441
See application file for complete search history.

(56) References Cited

U.S. PATENT DOCUMENTS

| | | | |
|---|---|---|---|
| 3,564,223 A | 2/1971 | Harris et al. | |
| 4,095,778 A | 6/1978 | Wing | |
| 4,646,326 A | 2/1987 | Backof, Jr. et al. | |
| 4,703,507 A | 10/1987 | Holden | |
| 4,893,316 A | 1/1990 | Janc et al. | |
| 5,007,087 A | 4/1991 | Bernstein et al. | |
| 5,048,086 A | 9/1991 | Bianco et al. | |

(Continued)

FOREIGN PATENT DOCUMENTS

| EP | 0 849 664 A2 | 6/1998 |
|---|---|---|
| EP | 0 949 563 | 10/1999 |

(Continued)

OTHER PUBLICATIONS

Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.

(Continued)

*Primary Examiner* — David C. Payne
*Assistant Examiner* — Syed Haider
(74) *Attorney, Agent, or Firm* — Fox Rothschild, LLP; Robert J. Sacco

(57) ABSTRACT

A spread spectrum communication system includes a channel encoder configured for modulating a carrier signal with data to form an information signal. A spreading sequence generator is configured for generating a spreading sequence having a phase angle dependent upon a chaotic sequence and contiguously distributed over a predetermined range. The chaotic sequence also has a magnitude which is selectively dependent upon the pseudo-random number or chaotic sequence. The invention also includes a multiplier configured for forming a spread spectrum signal by multiplying the information signal by the spreading sequence. The spreading sequence generator is responsive to a magnitude control signal for controlling the selective dependency of said magnitude. The magnitude can be constant to form a constant amplitude zero autocorrelation signal. Alternatively, the magnitude can be allowed to vary in selectively controlled chaotic or pseudo-random manner to vary a peak to average power ratio.

29 Claims, 6 Drawing Sheets

U.S. PATENT DOCUMENTS

| | | | |
|---|---|---|---|
| 5,077,793 | A | 12/1991 | Falk et al. |
| 5,210,770 | A | 5/1993 | Rice |
| 5,276,633 | A | 1/1994 | Fox et al. |
| 5,297,153 | A | 3/1994 | Baggen et al. |
| 5,297,206 | A | 3/1994 | Orton |
| 5,319,735 | A | 6/1994 | Preuss et al. |
| 5,412,687 | A | 5/1995 | Sutton et al. |
| 5,596,600 | A * | 1/1997 | Dimos et al. .................. 375/148 |
| 5,598,476 | A | 1/1997 | LaBarre et al. |
| 5,646,997 | A | 7/1997 | Barton |
| 5,677,927 | A | 10/1997 | Fullerton et al. |
| 5,680,462 | A | 10/1997 | Miller et al. |
| 5,757,923 | A | 5/1998 | Koopman, Jr. |
| 5,811,998 | A | 9/1998 | Lundberg et al. |
| 5,852,630 | A | 12/1998 | Langberg et al. |
| 5,900,835 | A | 5/1999 | Stein |
| 5,923,760 | A | 7/1999 | Abarbanel et al. |
| 5,924,980 | A | 7/1999 | Coetzee |
| 5,937,000 | A | 8/1999 | Lee et al. |
| 6,014,446 | A | 1/2000 | Finkelstein |
| 6,023,612 | A | 2/2000 | Harris et al. |
| 6,038,317 | A | 3/2000 | Magliveras et al. |
| 6,078,611 | A | 6/2000 | La Rosa et al. |
| 6,141,786 | A | 10/2000 | Cox et al. |
| 6,212,239 | B1 | 4/2001 | Hayes |
| 6,304,216 | B1 | 10/2001 | Gronemeyer |
| 6,304,556 | B1 | 10/2001 | Haas |
| 6,310,906 | B1 | 10/2001 | Abarbanel et al. |
| 6,314,187 | B1 | 11/2001 | Menkhoff et al. |
| 6,331,974 | B1 | 12/2001 | Yang et al. |
| 6,377,782 | B1 | 4/2002 | Bishop et al. |
| 6,473,448 | B1 | 10/2002 | Shono et al. |
| 6,570,909 | B1 | 5/2003 | Kansakoski et al. |
| 6,614,914 | B1 | 9/2003 | Rhoads et al. |
| 6,665,692 | B1 | 12/2003 | Nieminen |
| 6,732,127 | B2 | 5/2004 | Karp |
| 6,744,893 | B1 | 6/2004 | Fleming-Dahl |
| 6,754,251 | B1 | 6/2004 | Sriram et al. |
| 6,766,345 | B2 | 7/2004 | Stein et al. |
| 6,842,479 | B2 | 1/2005 | Bottomley |
| 6,842,745 | B2 | 1/2005 | Occhipinti et al. |
| 6,864,827 | B1 | 3/2005 | Tise et al. |
| 6,865,218 | B1 | 3/2005 | Sourour |
| 6,888,813 | B1 * | 5/2005 | Kishi .......................... 370/342 |
| 6,901,104 | B1 | 5/2005 | Du et al. |
| 6,937,568 | B1 | 8/2005 | Nicholl et al. |
| 6,980,656 | B1 | 12/2005 | Hinton, Sr. et al. |
| 6,980,657 | B1 | 12/2005 | Hinton, Sr. et al. |
| 6,986,054 | B2 | 1/2006 | Kaminaga et al. |
| 6,993,016 | B1 | 1/2006 | Liva et al. |
| 6,999,445 | B1 | 2/2006 | Dmitriev et al. |
| 7,023,323 | B1 | 4/2006 | Nysen |
| 7,027,598 | B1 | 4/2006 | Stojancic et al. |
| 7,035,220 | B1 | 4/2006 | Simcoe |
| 7,069,492 | B2 | 6/2006 | Piret et al. |
| 7,076,065 | B2 | 7/2006 | Sherman et al. |
| 7,078,981 | B2 | 7/2006 | Farag |
| 7,079,651 | B2 | 7/2006 | Den Boer et al. |
| 7,095,778 | B2 | 8/2006 | Okubo et al. |
| 7,133,522 | B2 | 11/2006 | Lambert |
| 7,170,997 | B2 | 1/2007 | Petersen et al. |
| 7,190,681 | B1 | 3/2007 | Wu |
| 7,200,225 | B1 | 4/2007 | Schroeppel |
| 7,233,969 | B2 | 6/2007 | Rawlins et al. |
| 7,233,970 | B2 | 6/2007 | North et al. |
| 7,245,723 | B2 | 7/2007 | Hinton, Sr. et al. |
| 7,269,198 | B1 | 9/2007 | Elliott et al. |
| 7,269,258 | B2 | 9/2007 | Ishihara et al. |
| 7,272,168 | B2 | 9/2007 | Akopian |
| 7,277,540 | B1 | 10/2007 | Shiba et al. |
| 7,286,802 | B2 | 10/2007 | Beyme et al. |
| 7,310,309 | B1 | 12/2007 | Xu |
| 7,349,381 | B1 | 3/2008 | Clark et al. |
| 7,423,972 | B2 | 9/2008 | Shaham et al. |
| 7,529,292 | B2 | 5/2009 | Bultan et al. |
| 7,643,537 | B1 | 1/2010 | Giallorenzi et al. |
| 7,725,114 | B2 | 5/2010 | Feher |
| 7,779,060 | B2 | 8/2010 | Kocarev et al. |
| 7,830,214 | B2 | 11/2010 | Han et al. |
| 7,853,014 | B2 | 12/2010 | Blakley et al. |
| 7,929,498 | B2 | 4/2011 | Ozluturk et al. |
| 7,949,032 | B1 * | 5/2011 | Frost ............................ 375/140 |
| 7,974,146 | B2 | 7/2011 | Barkley |
| 2001/0017883 | A1 | 8/2001 | Tiirola et al. |
| 2002/0012403 | A1 | 1/2002 | McGowan et al. |
| 2002/0034191 | A1 | 3/2002 | Shattil |
| 2002/0034215 | A1 | 3/2002 | Inoue et al. |
| 2002/0041623 | A1 | 4/2002 | Umeno |
| 2002/0054682 | A1 | 5/2002 | Di Bernardo et al. |
| 2002/0094797 | A1 | 7/2002 | Marshall et al. |
| 2002/0099746 | A1 | 7/2002 | Tie et al. |
| 2002/0110182 | A1 | 8/2002 | Kawai |
| 2002/0115461 | A1 * | 8/2002 | Shiraki et al. ................. 455/522 |
| 2002/0122465 | A1 | 9/2002 | Agee et al. |
| 2002/0128007 | A1 * | 9/2002 | Miyatani ....................... 455/423 |
| 2002/0172291 | A1 | 11/2002 | Maggio et al. |
| 2002/0174152 | A1 | 11/2002 | Terasawa et al. |
| 2002/0176511 | A1 | 11/2002 | Fullerton et al. |
| 2002/0186750 | A1 | 12/2002 | Callaway et al. |
| 2003/0007639 | A1 | 1/2003 | Lambert |
| 2003/0016691 | A1 | 1/2003 | Cho |
| 2003/0044004 | A1 | 3/2003 | Blakley et al. |
| 2003/0156603 | A1 | 8/2003 | Rakib et al. |
| 2003/0182246 | A1 | 9/2003 | Johnson et al. |
| 2003/0198184 | A1 | 10/2003 | Huang et al. |
| 2004/0001556 | A1 | 1/2004 | Harrison et al. |
| 2004/0059767 | A1 | 3/2004 | Liardet |
| 2004/0092291 | A1 | 5/2004 | Legnain et al. |
| 2004/0100588 | A1 | 5/2004 | Hartson et al. |
| 2004/0146095 | A1 | 7/2004 | Umeno et al. |
| 2004/0156427 | A1 | 8/2004 | Gilhousen et al. |
| 2004/0161022 | A1 | 8/2004 | Glazko et al. |
| 2004/0165650 | A1 * | 8/2004 | Miyazaki et al. ............. 375/141 |
| 2004/0165681 | A1 | 8/2004 | Mohan |
| 2004/0184416 | A1 | 9/2004 | Woo |
| 2004/0196212 | A1 | 10/2004 | Shimizu |
| 2004/0196933 | A1 * | 10/2004 | Shan et al. ..................... 375/346 |
| 2005/0004748 | A1 | 1/2005 | Pinto et al. |
| 2005/0021308 | A1 | 1/2005 | Tse et al. |
| 2005/0031120 | A1 | 2/2005 | Samid |
| 2005/0050121 | A1 | 3/2005 | Klein et al. |
| 2005/0075995 | A1 | 4/2005 | Stewart et al. |
| 2005/0089169 | A1 | 4/2005 | Kim et al. |
| 2005/0129096 | A1 | 6/2005 | Zhengdi et al. |
| 2005/0207574 | A1 | 9/2005 | Pitz et al. |
| 2005/0249271 | A1 | 11/2005 | Lau et al. |
| 2005/0254587 | A1 * | 11/2005 | Kim et al. ..................... 375/260 |
| 2005/0259723 | A1 | 11/2005 | Blanchard |
| 2005/0265430 | A1 | 12/2005 | Ozluturk et al. |
| 2005/0274807 | A1 | 12/2005 | Barrus et al. |
| 2006/0034378 | A1 * | 2/2006 | Lindskog et al. ............. 375/260 |
| 2006/0072754 | A1 | 4/2006 | Hinton et al. |
| 2006/0088081 | A1 | 4/2006 | Withington et al. |
| 2006/0093136 | A1 | 5/2006 | Zhang et al. |
| 2006/0123325 | A1 | 6/2006 | Wilson et al. |
| 2006/0209926 | A1 | 9/2006 | Umeno et al. |
| 2006/0209932 | A1 | 9/2006 | Khandekar et al. |
| 2006/0239334 | A1 | 10/2006 | Kwon et al. |
| 2006/0251250 | A1 * | 11/2006 | Ruggiero et al. ............... 380/46 |
| 2006/0264183 | A1 | 11/2006 | Chen et al. |
| 2007/0098054 | A1 * | 5/2007 | Umeno .......................... 375/150 |
| 2007/0121945 | A1 | 5/2007 | Han et al. |
| 2007/0133495 | A1 | 6/2007 | Lee et al. |
| 2007/0149232 | A1 | 6/2007 | Koslar |
| 2007/0195860 | A1 | 8/2007 | Yang et al. |
| 2007/0201535 | A1 | 8/2007 | Ahmed |
| 2007/0217528 | A1 * | 9/2007 | Miyoshi et al. ............... 375/260 |
| 2007/0230701 | A1 | 10/2007 | Park et al. |
| 2007/0253464 | A1 | 11/2007 | Hori et al. |
| 2007/0291833 | A1 | 12/2007 | Shimanskiy |
| 2008/0008320 | A1 | 1/2008 | Hinton et al. |
| 2008/0016431 | A1 | 1/2008 | Lablans |
| 2008/0019422 | A1 * | 1/2008 | Smith et al. .................... 375/136 |
| 2008/0075195 | A1 * | 3/2008 | Pajukoski et al. ............. 375/298 |
| 2008/0080439 | A1 | 4/2008 | Aziz et al. |
| 2008/0084919 | A1 | 4/2008 | Kleveland et al. |
| 2008/0095215 | A1 | 4/2008 | McDermott et al. |

| | | | |
|---|---|---|---|
| 2008/0107268 | A1 | 5/2008 | Rohde et al. |
| 2008/0198832 | A1 | 8/2008 | Chester |
| 2008/0204306 | A1 | 8/2008 | Shirakawa |
| 2008/0263119 | A1 | 10/2008 | Chester et al. |
| 2008/0294707 | A1 | 11/2008 | Suzuki et al. |
| 2008/0294710 | A1 | 11/2008 | Michaels |
| 2008/0294956 | A1 | 11/2008 | Chester et al. |
| 2008/0304553 | A1 | 12/2008 | Zhao et al. |
| 2008/0304666 | A1 | 12/2008 | Chester et al. |
| 2008/0307022 | A1 | 12/2008 | Michaels et al. |
| 2008/0307024 | A1 | 12/2008 | Michaels et al. |
| 2009/0022212 | A1 | 1/2009 | Ito et al. |
| 2009/0034727 | A1 | 2/2009 | Chester et al. |
| 2009/0044080 | A1 | 2/2009 | Michaels et al. |
| 2009/0059882 | A1 | 3/2009 | Hwang et al. |
| 2009/0086848 | A1* | 4/2009 | Han et al. ............... 375/295 |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |
| 2009/0285395 | A1 | 11/2009 | Hu et al. |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0316679 | A1 | 12/2009 | Van Der Wateren |
| 2009/0323766 | A1 | 12/2009 | Wang et al. |
| 2009/0327387 | A1 | 12/2009 | Michaels et al. |
| 2010/0030832 | A1 | 2/2010 | Mellott |
| 2010/0054225 | A1 | 3/2010 | Hadef et al. |
| 2010/0073210 | A1 | 3/2010 | Bardsley et al. |
| 2010/0111296 | A1 | 5/2010 | Brown et al. |
| 2010/0142593 | A1 | 6/2010 | Schmid |
| 2010/0254430 | A1 | 10/2010 | Lee et al. |
| 2010/0260276 | A1* | 10/2010 | Orlik et al. ............... 375/260 |
| 2011/0222393 | A1* | 9/2011 | Kwak et al. ............... 370/208 |

FOREIGN PATENT DOCUMENTS

| | | |
|---|---|---|
| EP | 2 000 900 A2 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2004343509 A | 12/2004 |
| JP | 2005017612 A | 1/2005 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

Taylor, F.J., "Residue Arithmetic A Tutorial with Examples", Computer, vol. 17, No. 5, pp. 50-62, May 1984, doi: 10.1109/MC. 1984. 1659138.

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. _1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002, Oct. 4, 2002, pp. 841-846, XP002575052 Retrieved from the Internet: URL:http://ieeexplore. ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—AWolfram Web Resource [online] [retrieved on Nov. 8, 2010] Retrieved from the Internet: <http://mathworld.wolfram.com/surjection.html>.

Weisstein, E., Surejection:, From MathWorld—AWolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Socek, D., et al., Short Paper: Enhanced 1-D Chaotic Key Based Algorithm for Image Encryption, Sep. 2005, IEEE.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++Users Journal; Oct. 2004, vol. 22 Issue 10, p. 14-18, 4p, 1 Color Photograph.

Diaz-Toca, G.M. and Lombardi, H. , Dynamic Galois Theory., Journal of Symbolic Computation; Dec. 2010, vol. 45 Issue 12, p. 1316-1329, 14p.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Barile, Margherita, "Bijective," From MathWorld—A Wolfram Web Resource, created by Eric W. Weisstein. http://mathworld.wolfram.com/Bijective.html.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.

Morsche et al., "Signals and Systems," lecture notes, University of Eindhoven, The Netherlands (1999).

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, Nl, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html.

Weisstein, Eric W. "Surjection," From MathWorld—A Wolfram Web Resource, http://mathworld.wolfram.com/Surjection.html.

Yen, et al., (1999) "Residual Number System Assisted CDMA: A New System Concept", In: ACTS'99, Jun. 16-18, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable Papr Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Micheals, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "AD-HOC Network Acquisition Using Chaotic Sequence Spread Waveform".

Michaels, Alan, U.S. Appl. No. 12/201,021, filed Aug. 29, 2008, entitled, "Multi-Tier AD-HOC Network Communications".

Bender, et al., "Techniques for data hiding", 1995, IBM Systems Journal, vol. 35, pp. 313-336.

Japanese Office Action dated Aug. 29, 2012, Application Serial No. 2011-531166 in the name of Harris Corporation.

Office Action issued in Japanese Patent Application No. 2010-504206 in the name of Harris Corporation; mailed Jan. 6, 2012.

\* cited by examiner

ANTI-JAM COMMUNICATIONS HAVING SELECTIVELY VARIABLE PEAK-TO-AVERAGE POWER RATIO INCLUDING A CHAOTIC CONSTANT AMPLITUDE ZERO AUTOCORRELATION WAVEFORM

BACKGROUND OF THE INVENTION

1. Statement of the Technical Field

The invention concerns communications systems. More particularly, the invention concerns chaotic spread spectrum communications systems having improved transmit power capabilities based on reduced peak-to-average power ratio (PAPR) waveforms.

2. Description of the Related Art

Pseudorandom number generators (PRNG) used to generate chipping sequences in conventional direct sequence spread spectrum (DSSS) communication systems generally utilize digital logic or a digital computer and one or more algorithms to generate a sequence of numbers. While the output of conventional PRNG may approximate some of the properties of random numbers, they are not truly random. For example, the output of many PRNG have cyclostationary features that can be identified by analytical processes independent of whether or not the spreading sequence is constant energy.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically. In general, a chaotic sequence is one in which the sequence is empirically indistinguishable from true randomness absent some knowledge regarding the algorithm which is generating the chaos.

Some have proposed the use of multiple pseudo-random number generators to generate a digital chaotic-like sequence. However, such systems only produce more complex pseudo-random number sequences that possess all pseudo-random artifacts and no chaotic properties. While certain polynomials can generate chaotic behavior, it is commonly held that arithmetic required to generate chaotic number sequences requires an impractical implementation due to the precisions required.

Communications systems utilizing chaotic sequences offer promise for being the basis of a next generation of low probability of intercept (LPI) waveforms, low probability of detection (LPD) waveforms, and secure waveforms. While many such communications systems have been developed for generating chaotically modulated waveforms, such communications systems suffer from low throughput. The term "throughput", as used herein, refers to the amount of data transmitted over a data link during a specific amount of time. This throughput limitation stems from the fact that a chaotic signal is produced by means of an analog chaotic circuit subject to drift.

The throughput limitation with chaos based communication systems can be traced to the way in which chaotic circuits have been implemented. The reason for reliance on analog circuits for this task has been the widely held conventional belief that efficient digital generation of chaos is impossible.

Notwithstanding the apparent necessity of using analog type chaos generators, that approach has not been without problems. For example, analog chaos generator circuits are known to drift over time. The term "drift", as used herein, refers to a slow long term variation in one or more parameters of a circuit. The problem with such analog circuits is that the inherent drift forces the requirement that state information must be constantly transferred over a communication channel to keep a transmitter and receiver synchronized.

The transmitter and receiver in coherent chaos based communication systems are synchronized by exchanging state information over a data link. Such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

The alternative to date has been to implement non-coherent chaotic waveforms. However, non-coherent waveform based communication systems suffer from reduced throughput and error rate performance. In this context, the phrase "non-coherent waveform" means that the receiver is not required to reproduce a synchronized copy of the chaotic signals that have been generated in the transmitter. The phrase "communications using a coherent waveform" means that the receiver is required to reproduce a synchronized copy of the chaotic signals that have been generated in the transmitter.

Chaotic waveforms have differing characteristics which are dependent on how the chaos is generated and its target application. For example, chaos can be generated with a Gaussian distribution for use in maximum entropy communication systems with maximum channel capacity or low probability of intercept and low probability detection. Gaussian distributed chaos can be used as a spreading sequence in a chaotic spread spectrum communication system. One practical downside to the use of Gaussian distributed spread spectrum chaotic communications waveforms is the peak-to-average power ratio (PAPR). Typically, the PAPR in a chaotic spread waveform is about 13 dB. This means that the instantaneous peak power level of the chaotic spread waveform signal is 13 dB or 20 times greater as compared to the average power level. In order to avoid significant distortion, any high power amplifier (HPA) used with such a waveform is operated at a gain level such that the instantaneous peak power levels do not result in overdriving the amplifier. However, if the PAPR is 13 dB, this means that, on average, the amplifier output power is 13 dB lower than the maximum or peak power output that the HPA is capable of providing. This is sometimes referred to as HPA back-off.

For LPI/LPD applications, the reduced amplifier gain necessitated by a 13 dB PAPR is not a major concern since the goal is to reduce transmitted power as far as possible, and transmitters in such instances are not usually operated close to compression points. Other operational scenarios however, like satellite communications waveforms, power challenged systems, and anti-jamming waveforms to name a few benefit from the ability to emit as much power as possible without signal distortion. Reducing the HPA back-off permits a higher transmitted power and therefore a direct contribution to link margin, which provides improved communications link capabilities (e.g., increased signal-to-noise ratio at the receiver). Thus, there is a need for chaotic waveforms that retain many of the advantages of coherent chaotic communication systems and provide a low operating PAPR.

SUMMARY OF THE INVENTION

Embodiments of the present invention concern methods for generating an adaptive PAPR chaotic communication signal. The methods involve phase modulating a carrier signal with data to form an information signal. The methods also involve generating a chaotic spreading sequence based on a chaotic number sequence. The chaotic spreading sequence has a time-varying amplitude that exhibits a constant power envelope. The chaotic spreading sequence also has a variable arbitrary phase angle. The phase angle comprises phase values which are uniformly distributed over a predetermined range of angles. The methods further involve forming a spread spectrum signal by multiplying the information signal by the chaotic spreading sequence. The spread spectrum signal has a constant power envelope and a zero autocorrelation, commonly called a constant amplitude zero autocorrelation (CAZAC) waveform.

The spread spectrum signal can be communicated from a first communications device to a second communication device. At the second communication device, a chaotic de-spreading sequence is digitally generated that is identical to the chaotic spreading sequence. The spread spectrum signal is de-spread by using the chaotic de-spreading sequence to recover the information signal. The information signal is then demodulated to recover the data. Notably, the chaotic spreading sequence and the chaotic de-spreading sequence are synchronized.

According to aspects of the present invention, the chaotic spreading sequence is selectively modified to induce a pseudorandom or chaotic variation in a magnitude of the chaotic spreading sequence to increase the PAPR of the spread spectrum signal. An average deviation of the magnitude is modified to selectively control the PAPR of the spread spectrum signal. The average deviation is modified in response to measured or estimated operational parameters. The operational parameters affect link performance of a communication system. The phase values are selected to have a plurality of uniformly distributed phase values, wherein a number of phases is matched to subsequent signal processing to form a continuous distribution over the predetermined range of angles. At least one of the phase values is chaotically varied for each chip of the chaotic spreading sequence.

According to other aspects of the present invention, the chaotic spreading sequence is generated by selecting a plurality of chaotic polynomial equations. Residue number system (RNS) arithmetic operations are used to respectively determine a plurality of solutions for the chaotic polynomial equations. The solutions are iteratively computed and expressed as RNS residue values. A chaotic series of digits is then determined in a weighted number system based on the RNS residue values.

Embodiments of the present invention also concern spread spectrum communication systems. Each of the spread spectrum communication systems includes a channel encoder, a spreading sequence generator, transmitter controller, a multiplier and a high power amplifier. The channel encoder is configured for phase modulating a carrier signal with data to form an information signal. The spreading sequence generator is configured for generating a spreading sequence. The spreading sequence has a phase angle dependent upon a chaotic number sequence and a magnitude which is selectively dependent upon a pseudo-random number or chaotic sequence. The phase angle includes phase values which have a band limited uniform distribution over a predetermined range of angles. The spreading sequence generator is also configured to cause a pseudo-random or chaotic variation in the magnitude. The spreading sequence generator is further configured for selectively varying an average deviation of the magnitude of the spreading sequence in response to a magnitude control signal.

The transmitter controller is configured to generate the magnitude control signal. The transmitter controller is also configured to cause the average deviation of the magnitude of the spreading sequence to vary in response to a measured or estimated system performance. The multiplier is configured for forming a spread spectrum signal by multiplying the information signal by the spreading sequence. The spreading sequence generator is responsive to a control signal for controlling the selective dependency of the magnitude. The high power amplifier is configured for amplifying the spread spectrum signal. The high power amplifier is responsive to an HPA control signal for selectively varying a gain of the high power amplifier as an average deviation of the magnitude is varied.

According to an aspect of the present invention, the spreading sequence generator includes a chaos generator configured for digitally generating a chaotic spreading sequence. The chaos generator is configured to digitally generate said chaotic spreading sequence by selecting a plurality of chaotic polynomial equations. RNS arithmetic operations are used to respectively determine a plurality of solutions for the chaotic polynomial equations. The solutions iteratively computed and expressed as RNS residue values. A series of chaotic digits is determined in a weighted number system based on the RNS residue values.

The spread spectrum communication system can also comprise a digital modulator, a digital-to-analog converter, and an IF to RF translator. The digital modulator is configured for translating the spread spectrum signal from a first IF frequency to second IF frequency. The digital-to-analog converter is configured for converting the spread spectrum signal to a first analog IF spread spectrum signal. The IF to RF translator is configured for converting the first analog IF spread spectrum signal to an analog RF spread spectrum signal suitable for transmission.

The spread spectrum communication can further include a receiver, a de-spreading sequence, a correlator and a channel decoder. The receiver is configured for receiving the analog RF spread spectrum signal. The receiver is also configured for converting the analog RF spread spectrum signal to a second analog IF spread spectrum signal. The receiver is further configured for digitizing the second analog IF spread spectrum signal. The de-spreading sequence generator is configured for digitally generating a de-spreading sequence identical to the spreading sequence. The correlator is configured for de-spreading the second analog IF spread spectrum signal using the de-spreading sequence to recover the information signal. The channel decoder is configured for de-modulating the information signal to recover the data.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
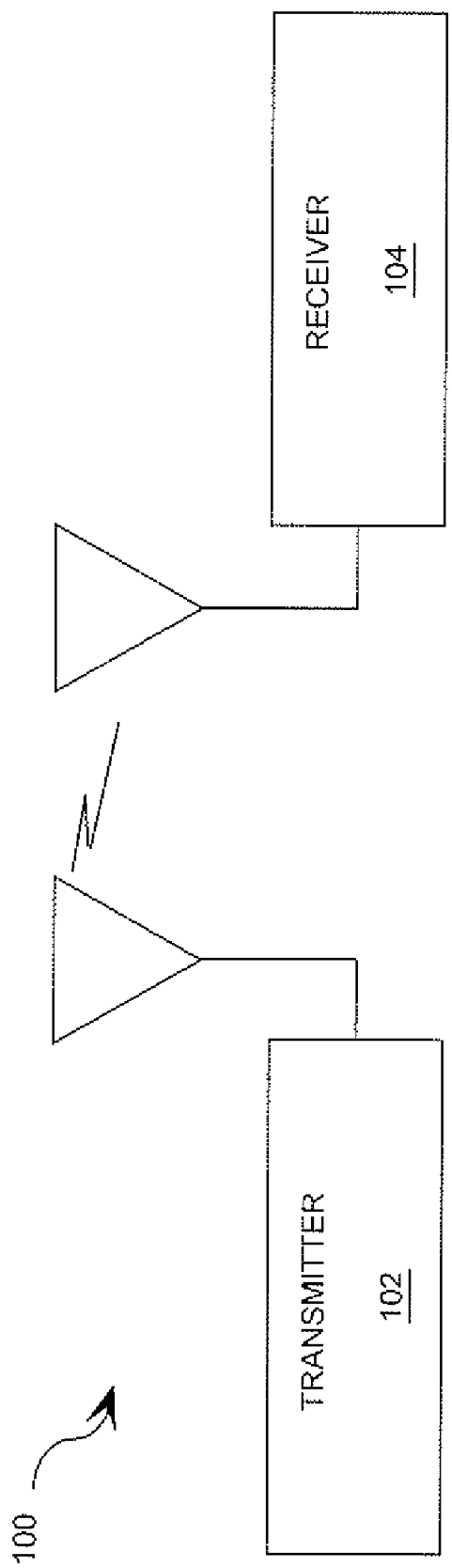
FIG. 1 is a block diagram of a coherent chaotic spread-spectrum communication system that is useful for understanding the invention.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system or a computer program product. Accordingly, the present invention can take form as an entirely hardware embodiment, an entirely software embodiment or a hardware/software embodiment.

Spread spectrum signals generated using Gaussian distributed chaotic sequences have a peak to average power ratio (PAPR) of about 13 dB. This difference between peak and average power requires high power amplifier (HPA) gain to be reduced in order to avoid signal distortion. The reduction in gain is commonly referred to as HPA back-off because the gain of the amplifier must be reduced or "backed-off" from a compression point in order to ensure that the amplifier output is not distorted during times of peak signal amplitude. Notwithstanding the necessity of HPA back-off to prevent signal distortion, the technique does have its disadvantages. When HPA gain is reduced, the resulting average signal power output from the amplifier is reduced, thereby limiting its ability to overcome interference associated with natural and man-made interference. Further, when the signal must go through a multiple function repeater like a "bent pipe" satellite, the HPA gain may not be controllable. The invention overcomes this problem by providing a chaotic spread spectrum communication system which according to one embodiment, provides a constant amplitude, zero autocorrelation (CAZAC) chaotic output signal. Alternatively, or in addition thereto, the system can variably control a PAPR responsive to operational conditions. Reducing the PAPR allows the signal to be transmitted with a higher average power by a given transmitter HPA. The PAPR can be adjusted to variably transform the output signal from a chaotic CAZAC type signal to a chaotic signal which has a higher value PAPR. For example, the signal can be configured to transform a transmitted output from the chaotic CAZAC waveform to a truly Gaussian chaotic waveform that appears to the casual observer as nothing more than Gaussian noise.

The invention concerns a chaotic spread spectrum communication system in which a spreading code is obtained from a uniformly distributed chaotic sequence. For purposes of generating the chaotic CAZAC signal, the spreading code is characterized by constant magnitude, but a uniformly distributed varying phase angle over a contiguous range of angles. The resulting chaotic spread spectrum signal has a lower PAPR compared to spread spectrum signals where the spreading code relies upon a spreading sequence in which both the magnitude and phase are varied by a pseudo-random sequence or by a chaotic sequence with a non constant magnitude distribution. This allows for increased transmitter gain settings, higher average power of transmitted signals, and improved resistance to natural and man-made interference.

In the second embodiment, the invention involves generating the spreading sequence so as to dynamically vary the PAPR. The spreading sequence is selected to produce quadrature sample pairs which have the same variable arbitrary phase angles as described above in the chaotic CAZAC variation, but can also be variable within a statistically predefined deviation range of magnitudes which is selectively variably controlled. The selective variable control of the statistical magnitude deviation of the spreading sequence advantageously allows the PAPR of the resulting signal to be variably controlled. Further, as the PAPR is increased, a high power amplifier gain setting is selectively reduced. Conversely, as the PAPR is reduced, a high power amplifier gain setting is selectively increased. Variation in the PAPR is advantageously performed in response to defined operational parameters, for example, a detected SNR of a particular communication environment. Thus, certain signal characteristics are advantageously dynamically varied on an as-needed basis in response to operating conditions.

A digital spread spectrum communications system for implementing the reduced PAPR spread spectrum signal will now be described with respect to FIG. 1 through FIG. 3. The communication system disclosed herein utilizes a coherent chaotic sequence spread spectrum (CCSSS) method. In this regard, the system uses a chaotic spreading sequence that is generated using a novel approach. However, it should be understood that the invention is not limited in this regard. Instead, the coherent chaotic sequence spread spectrum communication method can also be implemented using chaotic sequences with other distributions or hybrid chaotic and pseudo random sequences. Thus, a chaotic sequence can be used to affect some signal attributes while a pseudo-random number sequence can affect other signal attributes. Still, those skilled in the art will appreciate that the use of a chaotic sequence has certain advantages, and therefore the invention shall be described in that context.

Prior to being transmitted, data symbols are combined with a higher rate chaotic sequence. Depending on the operating mode, the spreading sequence chips have either a constant magnitude or an magnitude which is variable within a selectively chosen deviation range. In either case, the chips defined by the chaotic sequence have phase angles which vary in a chaotic manner over a pre-defined range of angles. The quantization of the angles is matched to subsequent filtering to form a continuous distribution within the limited bandwidth of the communication signal. The higher rate chaotic sequence spreads the spectral content of the data according to a spreading ratio. The resulting signal is a practically random signal, but this randomness can be removed at the receiving end to recover the original data. In particular, the data is recovered by de-spreading the received signal using the same chaotic sequence which is generated at a receiver. The CCSSS system in relation to FIGS. 1 through 3 channel encodes a baseband carrier with PSK symbols. The channel encoding is one of two operations commonly known as modulation. The other operation commonly known as modulation is mixing times a local oscillator or other sequence which results in frequency translation and is also used herein.

As noted above, the CCSSS system modulates the phase modulated carrier in a chaotic manner utilizing a string of discrete time chaotic samples. The discrete time chaotic samples shall hereinafter be referred to as "chips". The chips define the quadrature values with constant magnitude or defined variable magnitude as described herein. As will be appreciated by those familiar with direct sequence spread spectrum (DSSS) systems, each chip will generally have a much shorter duration than the duration of each of the information symbols. Thus, it will be understood that the carrier is modulated using the chaotic sequence chips. Moreover, it will be understood that the chip rate associated with the chaotic sequence is much higher than the symbol rate. It should also be understood that the chaotic sequence which is utilized for generating the transmitted signal is known a priori by the receiver. Consequently, the same chaotic sequence can be used at the receiver to reconstruct the non-spread carrier or remove the effect of spreading at the receiver.

System Overview

Referring now to FIG. 1, there is provided a coherent chaotic spread-spectrum communication system 100 that is useful for understanding the present invention. The coherent chaotic spread-spectrum communication system 100 is comprised of a transmitter 102 and a receiver 104. The transmitter 102 is configured to generate an amplitude-and-time-discrete baseband signal and to spread the amplitude-and-time-discrete baseband signal over a wide radio frequency band. This spreading consists of multiplying the amplitude-and-time-discrete baseband signal by a digital chaotic spreading sequence. In a first embodiment, the spreading sequence is selected to be of constant magnitude, but having statistically distributed phase variations over a predetermined range of phase angles (e.g. 0° to 360°). In a second embodiment, the spreading sequence can be selected to have a chaotic or pseudo-random magnitude which varies within a predetermined deviation range, but has statistically distributed chaotic phase variations over a predetermined range of phase angles (e.g. 0° to 360°). In the second embodiment, the spreading sequence can be selectively dynamically transformed from the constant magnitude associated with the chaotic CAZAC signal format to spreading chips having independent Rayleigh distributed magnitudes and uniform distributed phases, that is Gaussian distributed chaotic values. In either case, the product of this arithmetic operation is hereinafter referred to as a digital chaotic signal. In this regard, it should be understood that the transmitter 102 is also configured to process the digital chaotic signal to place the same in a proper analog form suitable for transmission over a communications link. The transmitter 102 is further configured to communicate analog chaotic signals to the receiver 104 via a communications link. The transmitter 102 will be described in greater detail below in relation to FIG. 2.

The receiver 104 is configured to receive transmitted analog chaotic signals from the transmitter 102. The receiver 104 is also configured to down convert, digitize, and de-spread a transmitted analog chaotic signal by correlating it with a replica of the chaotic sequence generated at the transmitter 102. The chaotic sequence is also time synchronized to the transmitted analog chaotic signal: i.e., it is coarsely synchronized with a clock reference (not shown) of the transmitter 102. The output of the arithmetic operation that de-spreads the received signal is hereinafter referred to as a de-spread signal. In this regard, it should be understood that the receiver 104 is further configured to process a de-spread signal for obtaining data contained therein. The receiver 104 is configured to convert the data into useful payload information. The receiver 104 is described in greater detail below in relation to FIG. 3.

Transmitter Detail

Figure 2:
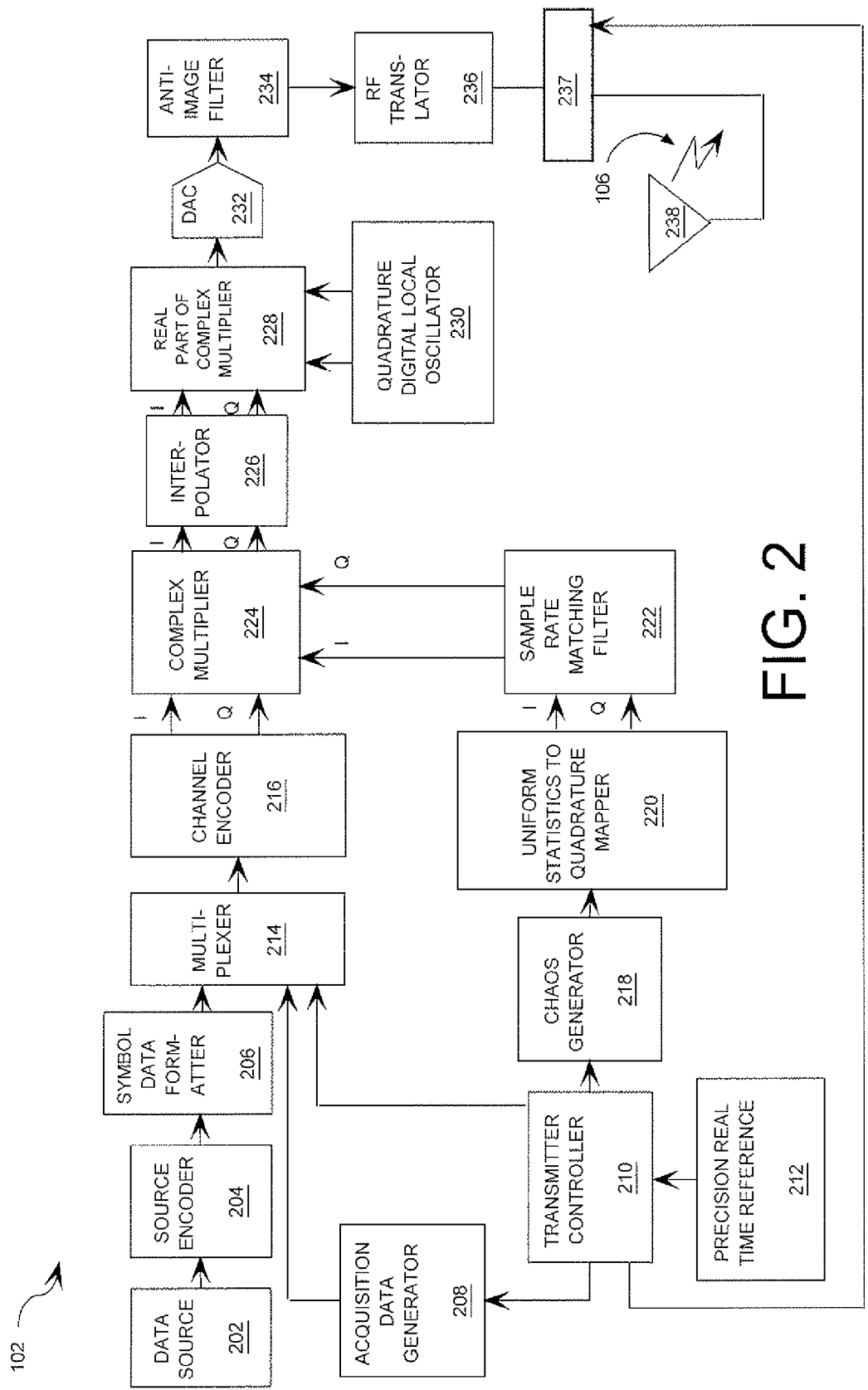
FIG. 2 is a block diagram of the transmitter shown in FIG. 1 that is useful for understanding the invention.

Referring now to FIG. 2, there is provided a bock diagram of the transmitter 102 shown in FIG. 1 that is useful for understanding the invention. It should be noted that the embodiment of FIG. 2 assumes that: (1) phase shift keying (PSK) data modulation is used; (2) no pulse shaping is applied to data symbols; (3) modulated data symbols are generated in quadrature form; and (4) chaotic spectral spreading is performed at an intermediate frequency (IF).

Referring again to FIG. 2, the transmitter 102 is comprised of a data source 202. The transmitter 102 is also comprised of a source encoder 204, a symbol data formatter 206, an acquisition data generator 208, a transmitter controller 210, a multiplexer 214, a channel encoder 216, a precision real time reference 212, and a digital complex multiplier 224. The transmitter 102 is further comprised of a chaos generator 218, a uniform statistics to quadrature mapping device (USQM) 220, and a sample rate matching filter (SRMF) 222. The transmitter 102 is further comprised of an interpolator 226, a quadrature digital local oscillator (LO) 230, a real part of a complex multiplier 228, a digital-to-analog converter (DAC) 232, an anti-image filter 234, an intermediate frequency (IF) to radio frequency (RF) conversion device 236, a high power amplifier (HPA) 237, and an antenna element 238. Each of the above listed components 202-216, 222-238 are well known to persons skilled in the art. Thus, these components will not be described in great detail herein. However, a brief discussion of the transmitter 102 architecture is provided to assist a reader in understanding the present invention.

Referring again to FIG. 2, the data source 202 is configured to receive bits of data from an external data source (not shown) as bits of data. In this regard, it should be appreciated that the data source 202 is an interface configured for receiving an input signal containing data from an external device (not shown). The data source 202 is further configured to supply bits of data to the source encoder 204 at a particular data transfer rate. The source encoder 204 can be configured to encode the data received from the external device (not shown) using a forward error correction coding scheme. The bits of data received at or generated by the source encoder 204 represent any type of information that may be of interest to a user. The source encoder 204 is further configured to supply bits of data to the symbol data formatter 206 at a particular data transfer rate.

The symbol data formatter 206 is configured to process bits of data for forming channel encoded symbol data. In a preferred embodiment, the source encoded symbols are phase shift keyed (PSK) encoded. If it is desired to use a non-coherent form of PSK with the coherent chaos spread spectrum system, then the symbol data formatter 206 can also be configured to differentially encode formed PSK symbol data. Differential encoding is well known to persons skilled in the art and therefore will not be described in great detail herein. The symbol data formatter 206 can be further configured to communicate non-differentially encoded PSK symbol data and/or differentially encoded PSK symbol data to the multiplexer 214. Still, embodiments of the present invention are not limited in this regard.

According to an embodiment of the invention, the symbol data formatter 206 is functionally similar to a serial in/parallel out shift register where the number of parallel bits out is equal to log base two ($log_2$) of the order of the channel encoder 216. In this regard, the symbol data formatter 206 is selected for use with a quadrature phase shift keying (QPSK) channel encoder. As such, the symbol data formatter 206 is configured to perform a QPSK formatting function for grouping two (2) bits of data together to form a QPSK symbol data word (i.e., a single two bit parallel word). Thereafter, the symbol data formatter 206 communicates the QPSK symbol data word to the multiplexer 214. Still, embodiments of the present invention are not limited in this regard.

According to another embodiment of the invention, the symbol data formatter 206 is functionally similar to a serial in/parallel out shift register where the number of parallel bits out is equal to log base two ($\log_2$) of the order of the channel encoder 216. In this regard, the symbol data formatter 206 is selected for use with a binary phase shift keying (BPSK) modulator. As such, the symbol data formatter 206 is configured to map one bit of data to a BPSK symbol data word. Thereafter, the symbol data formatter 206 communicates the BPSK symbol data word to the multiplexer 214. Still, embodiments of the present invention are not limited in this regard.

According to another embodiment of the invention, the symbol data formatter 206 is selected for use with a sixteen quadrature amplitude modulation (16QAM) modulator. As such, the symbol data formatter 206 is configured to map four (4) bits to a 16QAM symbol data word. Thereafter, the symbol data formatter 206 communicates the 16QAM symbol data word to the multiplexer 214. Still, embodiments of the present invention are not limited in this regard. For example, and without limitation, an embodiment of the invention can also utilize pulse amplitude modulation.

According to another embodiment of the invention, the symbol data formatter 206 is selected for use with a binary amplitude shift keying (ASK) modulator. As such, the symbol data formatter 206 is configured to map one bit of data to a ASK symbol data word. Thereafter, the symbol data formatter 206 communicates the ASK symbol data word to the multiplexer 214. Still, embodiments of the present invention are not limited in this regard.

The transmitter 102 also includes an acquisition data generator 208 capable of generating a "known data preamble" that can be used to enable initial synchronization of a chaotic sequence generated in the transmitter 102 and the receiver 104. The duration of this "known data preamble" is determined by an amount required by the receiver 104 to synchronize with the transmitter 102 under known worst case channel conditions. In some embodiments of the invention, the "known data preamble" is a repetition of the same known symbol. In other embodiments of the invention, the "known data preamble" is a series of known symbols. The acquisition data generator 208 can be further configured to communicate the "known data preamble" to the multiplexer 214.

Referring again to FIG. 2, the multiplexer 214 is configured to receive the binary word to be modulated by the channel encoder from the symbol data formatter 206. The multiplexer 214 is also configured to receive a "known data preamble" from the acquisition data generator 208. The multiplexer 214 is coupled to the transmitter controller 210. The transmitter controller 210 is configured to control the multiplexer 214 so that the multiplexer 214 routes the "known data preamble" to the channel encoder 216 at the time of a new transmission.

According to an alternative embodiment of the invention, the "known data preamble" is stored in a modulated form. In such a scenario, the architecture of FIG. 2 is modified such that the multiplexer 214 exists after the channel encoder 216. Still, embodiments of the present invention are not limited in this regard.

According to another embodiment of the invention, the "known data preamble" may be injected at known intervals to aid in periodic resynchronization of the chaotic sequence generated in the transmitter 102 and the receiver 104. This would typically be the case for an implementation meant to operate in harsh channel conditions. Still, embodiments of the present invention are not limited in this regard.

Referring again to FIG. 2, the multiplexer 214 is configured to select the symbol data words to be routed to the channel encoder 216 after a preamble period has expired. The multiplexer 214 is also configured to communicate the symbol data words to the channel encoder 216. In this regard, it should be appreciated that a communication of the symbol data words to the channel encoder 216 is delayed by a time defined by the length of the "known data preamble." As should be appreciated, this delay allows all of a "known data preamble" to be fully communicated to the channel encoder 216 prior to communication of the symbol data words.

Referring again to FIG. 2, the channel encoder 216 is configured to perform actions for representing the "known data preamble" and the symbol data words in the form of modulated amplitude-and-time-discrete digital signal symbols. The modulated amplitude-and-time-discrete digital signal is defined by digital words which represent intermediate frequency (IF) modulated symbols comprised of bits of data having a one (1) value or a zero (0) value. Methods for representing digital symbols by an amplitude-and-time-discrete digital signal are well known to persons skilled in the art. Thus, such methods will not be described in great detail herein. However, it should be appreciated that the channel encoder 216 can employ any such method. For example, the channel encoder 216 can be selected as a digital baseband modulator employing quadrature phase shift keying (QPSK). As will be appreciated by those skilled in the art, the output of the QPSK channel encoder will include an in-phase ("I") data and quadrature phase ("Q") data. The I and Q data will be thereafter communicated to the digital complex multiplier 224.

According to an embodiment of the invention, the transmitter 102 is further comprised of a sample rate matching device (not shown) between the channel encoder 216 and the digital complex multiplier 224. The sample rate matching device (not shown) is provided for registering the amplitude-and-time-discrete digital channel encoded signal for a symbol duration. As should be appreciated, the sample rate matching device (not shown) holds the symbol values constant so that a sample rate of the amplitude-and-time-discrete digital signal is an integer sub multiple of the digital chaotic sequence communicated to the digital complex multiplier 224. Still, embodiments of the present invention are not limited in this regard.

Referring again to FIG. 2, the digital complex multiplier 224 performs a complex multiplication in the digital domain. In the digital complex multiplier 224, the amplitude-and-time-discrete digital signal from the channel encoder 216 is multiplied by a digital representation of a chaotic sequence. The chaotic sequence is generated in the chaos generator 218. The rate at which the digital chaotic sequence is generated is chosen substantially higher than the data symbol rate; the ratio of the digital chaotic sequence rate and the data symbol rate is commonly called the "spreading ratio." The greater the ratio between the data symbol period and the sample period of the digital chaotic sequence, the higher a spreading ratio. The chaos generator 218 communicates the chaotic sequence to USQM 220.

The USQM 220 has a first and second operating mode. The operating mode is selected by a control processor which, in this embodiment, is transmitter controller 210. In the first operating mode, the USQM 220 is configured to cause transmitter 102 to produce a CAZAC output signal. In the first operating mode, the USQM 220 is configured to transform each digital chaotic sequence value to a corresponding quadrature form represented by I and Q values. The sequence of I and Q values are constrained to having a magnitude that advantageously remains constant for each I, Q pair in the sequence. Significantly, however, the phase angle defined by each pair of I, Q values will vary from one quadrature pair to the next such that the sequence of quadrature output values has uniformly distributed phase angles within a predefined range of possible phase angles. Stated differently, it can be said that the sequence of I, Q values define a sequence of spreading chips having a constant magnitude but variable phase angle characterized by values which are statistically uniformly distributed continuous to the level of quantization within a predefined range.

In the second operating mode, the USQM 220 is configured to cause transmitter 102 to produce a spread spectrum signal which is not CAZAC, but has a variable PAPR. More particularly, in the second operating mode, the USQM 220 is configured to statistically transform a digital chaotic sequence into a transformed digital chaotic sequence with chosen statistical properties. For example, the USQM 220 may take in two (2) uniformly distributed real inputs from the chaos generator 218 and convert those via a complex-valued bivariate Gaussian transformation to a quadrature output. The quadrature output can be chosen instead to have selectively variable statistical characteristics. For example, the statistical characteristics can be that of additive white Gaussian noise or a selectively modified version of such Gaussian noise having a truncated range of magnitude distributions.

More particularly, in the second operating mode, the quadrature output of USQM 220 is adaptively controlled so that the magnitude values can be selectively restricted to a reduced or truncated range. The reduced or truncated magnitude range can vary between some maximum statistical range associated with the Gaussian noise, and a minimum range, which is the same or approximately the same as the quadrature output produced USQM 220 in the first operating mode.

It should be understood that any pre-defined phase angle range can be selected for the purposes of the present invention. For example, phase angle ranges of 0° to 180°, 0° to 270°, or 90° to 360° can be used without limitation. Still, it is advantageous to use a relatively large range of phase angles such as a range from 0° to 360°. Conversions or mappings as described herein and performed by USQM 220 will be readily understood by those skilled in the art, and therefore will not be described in great detail. However, it should be understood that techniques used to perform such conversions or mappings may include the use of nonlinear processors, look-up tables, iterative processing (CORDIC functions), or other similar mathematical processes. The USQM 220 is further configured to communicate transformed chaotic sequences to the SRMF 222.

The I, Q values output from USQM 220 have a multi-bit resolution comparable with a resolution of the DAC 232. The USQM 220 communicates the transformed digital chaotic sequence to the SRMF 222. For example, the USQM 220 communicates an in-phase ("I") data and quadrature phase ("Q") data to the SRMF 222 when oversampling of the chaotic sequence is required to support subsequent signal processing operations, for example, sidelobe suppression (not shown). The chaotic sequence can therefore be resampled in the SRMF 222. For example, SRMF 222 can be comprised of a real sample rate matching filter to resample each of the in-phase and quadrature-phase processing paths of the chaotic sequence. The SRMF 222 is also configured to communicate a resampled, transformed digital chaotic sequence to the digital complex multiplier 224. More particularly, the SRMF 222 communicates an in-phase ("I") data and quadrature phase ("Q") data to the digital complex multiplier 224. Still, embodiments of the present invention are not limited in this regard.

The digital complex multiplier 224 performs a complex multiplication on the digital chaotic sequence output from the SRMF 222 and the amplitude-and-time-discrete digital signal output from the channel encoder 216. The resulting output is a digital representation of a coherent chaotic sequence spread spectrum modulated IF signal in which the digital data from the channel encoder 216 has been spread over a wide frequency bandwidth in accordance with a chaotic sequence generated by the chaos generator 218.

The digital complex multiplier 224 is configured to combine a digital chaotic sequence with an amplitude-and-time-discrete digital signal using an arithmetic operation. The arithmetic operation is selected as a complex-valued digital multiplication operation. The complex-valued digital multiplication operation includes multiplying the amplitude-and-time-discrete digital signal by the digital chaotic sequence to obtain a digital chaotic output signal. The digital complex multiplier 224 is also configured to communicate digital chaotic output signals to the interpolator 226.

The interpolator 226, real part of complex multiplier 228 and quadrature digital local oscillator 230 operate in tandem to form an intermediate frequency (IF) translator which frequency modulates a quadrature first intermediate frequency (IF) signal received from the complex multiplier to a second real intermediate frequency (IF) signal. Such digital intermediate frequency (IF) translators are known to those skilled in the art and shall not be discussed in detail here.

The interpolator 226 accepts an input from the complex multiplier 224. In a preferred embodiment the modulated symbols are in quadrature form and the interpolator is implemented as two real interpolators. Still, embodiments of the present invention are not limited in this regard.

The interpolator 226 raises the sample rate of the amplitude-and-time-discrete digital signal received from the complex multiplier 224 to a rate compatible with the bandwidth and center frequency of the second IF. The digital local oscillator 230 generates a complex quadrature amplitude-and-time-discrete digital sinusoid at a frequency which shall translate the first intermediate frequency (IF) to a desired second intermediate frequency (IF). The quadrature digital local oscillator 230 is also configured to pass its output to the real part of complex multiplier 228.

The real part of complex multiplier 228 is configured to accept as its inputs the quadrature output of the interpolator 228 and the quadrature output of the quadrature digital local oscillator 230. The real part of a complex multiplication is passed so that the real part of complex multiplier 228 implements only the real output portion of a complex multiplication. The real part of complex multiplier 228 is configured to pass its output to the DAC 232. Still, embodiments of the present invention are not limited in this regard.

According to an embodiment of the invention, the digital chaotic sequence and the amplitude-and-time-discrete digital signal are zero intermediate frequency (IF) signals. The digital chaotic sequence is used to amplitude modulate the "known data preamble" and the data symbols via an efficient instantiation of a complex multiplier. The result of this amplitude modulation process is a zero IF signal. Still, embodiments of the present invention are not limited in this regard.

Referring again to FIG. 2, complex multiplier 228 is configured to communicate a sampled digital chaotic output signal (i.e., a digital chaotic output signal having an increased sampling rate and non-zero intermediate frequency) to the DAC 232. The DAC 232 is configured to convert a sampled digital chaotic output signal to an analog signal. The DAC 232 is also configured to communicate an analog signal to the anti-image filter 234.

In some applications, it can be desirable to change a sampling rate at the output of the digital complex multiplier 224 only, for example when using an interpolating DAC. According to an embodiment of the invention, the digital complex multiplier 224 multiplies I and Q data of an amplitude-and-time-discrete digital signal by I and Q data of digital chaotic sequence to obtain a digital chaotic output signal. The digital chaotic output signal is a quadrature, zero IF signal. The DAC 232 is an interpolating DAC that increases the effective sample rate. The DAC 232 also up converts a real output component by a sub multiple of the interpolated sample frequency before conversion to an analog signal. The output of the DAC 232 is thus a real signal centered at some intermediate frequency. Still, embodiments of the present invention are not limited in this regard.

According to another embodiment of the invention, the digital complex multiplier 224 communicates the quadrature, zero IF signal to the IF translator. The IF translator is an interpolation filter 226 only. The interpolation filter 226 is comprised of dual real interpolators which change the sample rate of the quadrature, zero IF signal to a predetermined frequency. The interpolation filter 226 communicates the sampled, quadrature, zero IF signal to the DAC 232. The DAC 232 is an interpolating DAC that increases the effective sample rate. The DAC 232 also up converts a real output component by a sub multiple of the interpolated sample frequency before conversion to an analog signal. The output of the DAC 232 is thus a real signal centered at some intermediate frequency. Still, embodiments of the present invention are not limited in this regard.

Referring again to FIG. 2, the anti-image filter 234 is configured to remove spectral images from the analog signal to form a smooth time domain signal. The anti-image filter 234 is also configured to communicate a smooth time domain signal to an RF translator 236. The RF translator 236 is a wide bandwidth analog IF to RF up converter. The RF translator 236 is configured to center a smooth time domain signal at an RF for transmission thereby forming an RF signal. The RF translator 236 is also configured to communicate the RF signal to high power amplifier (HPA) 237. The HPA 237 is configured to amplify an input RF signal. The HPA power amplifier 237 is configured to communicate the amplified RF signal to the antenna element 238 for communication to a receiver 104 (described below in relation to FIG. 3).

It should be understood that the quality of the signal that is emitted from the antenna 238 may be affected by the HPA 237 if the input signal from the RF Translator 236 to the HPA 237 causes the HPA to compress. Compression points of HPAs 237 are well known in the art, so will not be discussed in detail here; however, it should be noted that amplifier compression can cause unwanted signal distortions in the output 106, requiring gain reduction, or HPA back-off, to maintain the output signal in the sufficiently linear region of the amplifier. In the present invention, HPA back-off is automatically dynamically controlled by transmitter controller 210 in conjunction with selectively varying the output of USQM 220. As the transmitter controller 210 causes USQM 220 to increase the amount of variation or deviation in the magnitude of spreading sequence, the transmitter controller 210 causes the gain of HPA 237 to be decreased. Control systems suitable for varying the gain of HPA 237 are well known in the art, and therefore will not be described here in detail.

It should be understood that the digital generation of the digital chaotic sequence at the transmitter 102 and receiver 104 is kept closely coordinated under the control of a precision real time reference 212 clock. The higher the precision of the clock 212, the closer the synchronization of the chaos generator 218 of the transmitter 102 and the chaos generator (described below in relation to FIG. 3) of the receiver 104 shall be excluding the effects of processing delay differences and channel propagation times. The use of a precision real time reference allows the states of the chaos generators to be easily controlled with precision.

Referring again to FIG. 2, the precision real time reference 212 is a stable local oscillator locked to a precision real time reference, such as a GPS clock receiver or a chip scale atomic clock (CSAC). The precision real time reference 212 is configured to supply a high frequency clock to the clocked logic circuits 204 through 232 while being locked to a lower frequency reference clock. The lower frequency reference clock supplies a common reference and a common real time of day reference to prevent a large drift between the states of the chaos generator 218 and the chaos generator (described below in relation to FIG. 3) of the receiver 104 over an extended time interval.

A person skilled in the art will appreciate that the transmitter 102 is one architecture of a communications system transmitter. However, the invention is not limited in this regard and any other transmitter architecture can be used without limitation. For example, the transmitter 102 can include real first to second intermediate frequency (IF) translation instead of a quadrature first to second intermediate frequency (IF) translation. As another example, other architectures may employ additional chaotic sequence generators to provide a switched chaotic output or to control other aspects of the transmitter 102.

Receiver Detail

Figure 3:
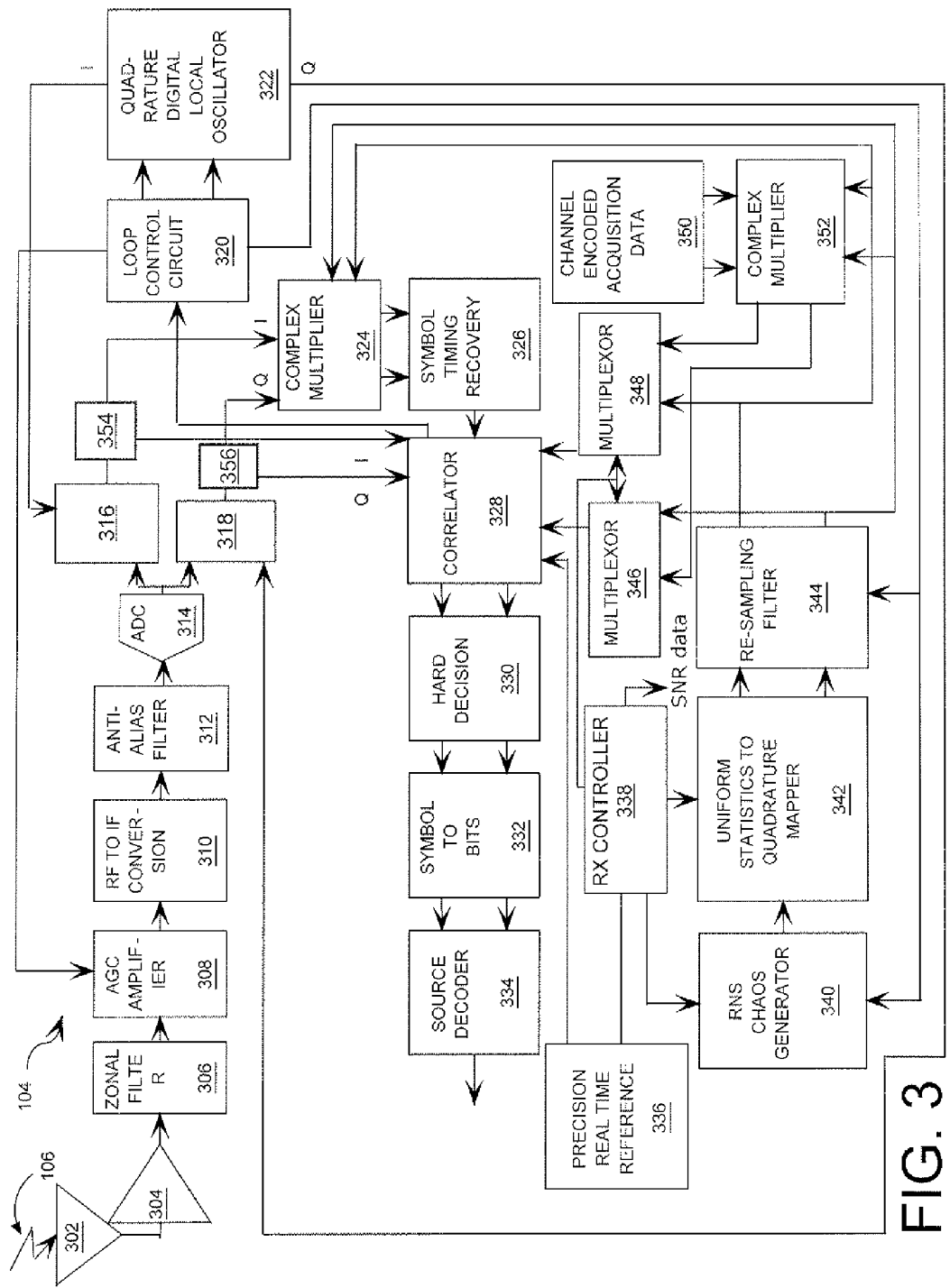
FIG. 3 is a block diagram of an embodiment of the receiver shown in FIG. 1 that is useful for understanding the invention.

Referring now to FIG. 3, there is provided a block diagram of the receiver 104 of FIG. 1 that is useful for understanding the invention. It should be noted that in conventional analog based coherent communications systems analog chaos circuits are synchronized by periodically exchanging state information. The exchange of state information requires a substantial amount of the transmitted bandwidth. This is what makes analog based coherent communications impracticable. The receiver 104 of FIG. 3 is designed to eliminate the drawbacks of conventional analog based coherent communications systems. In this regard it should be appreciated that the receiver 104 is comprised of a digital chaos generator. The receiver 104 includes a tracking loop for synchronizing its digital chaos generator and the digital chaos generator 218 of the transmitter 102. Most significantly, the receiver is configured to synchronize two (2) strings of discrete time chaotic samples (i.e., chaotic sequences) without using a constant or periodic transfer of state update information. A first string of discrete time chaotic samples is generated at the transmitter 102. A second string of discrete time chaotic samples is generated at the receiver 104.

Referring again to FIG. 3, the receiver 104 is comprised of an antenna element 302, a low noise amplifier (LNA) 304, a zonal filter 306, an AGC amplifier 308, a radio frequency (RF) to intermediate frequency (IF) conversion device 310, an anti-alias filter 312, and an analog-to-digital (A/D) converter 314. The receiver 104 is also comprised of real multipliers 316, 318, low pass filters 354, 356, a loop control circuit 320, a quadrature digital local oscillator 322, a correlator 328, multiplexers 346, 348, a channel encoded acquisition data generator (CEADG) 350, digital complex multipliers 324, 352, and a symbol timing recovery circuit 326. The receiver 104 is further comprised of a receiver controller 338, a precision real time reference clock 336, a hard decision device 330, a symbol to bits (S/B) converter 332, and a source decoder 334. The receiver 104 is comprised of a chaos generator 340, a uniform statistic to quadrature mapper (USQM) 342, and a re-sampling filter 344. Each of the above listed components and circuits 302-318, 322-326, 330-338, 344-356 are well known to persons skilled in the art. Thus, these components and circuits will not be described in great detail herein. However, a brief discussion of the receiver 104 architecture is provided to assist a reader in understanding the present invention. It should be noted that when the receiver 104 is in both acquisition and tracking modes (described below) the receiver 104 is utilizing a novel architecture/algorithm.

Referring again to FIG. 3, the antenna element 302 is configured to receive an analog input signal communicated from the transmitter 102 over a communications link. The antenna element 302 is also configured to communicate the analog input signal to the LNA 304. The LNA 304 is configured to amplify a received analog input signal while adding as little noise and distortion as possible. The LNA 304 is also configured to communicate an amplified, analog input signal to the zonal filer 306. Zonal filters are analog filters with slow roll off characteristic but low injection loss used to suppress large interfering signals outside of bands of interest. Zonal filters are well known to persons skilled in the art, and therefore will not be described in great detail herein. It should be appreciated that the zonal filter 306 is configured to communicate a filtered, analog input signal to the automatic gain control (AGC) amplifier 308. An automatic gain control (AGC) amplifier 308 is a controllable gain amplifier used to keep the magnitude of the received signal within normal bounds for the rest of the signal processing chain. Automatic gain control (AGC) amplifiers are well known to persons skilled in the art, and therefore will not be described in great detail herein. It should be appreciated that the automatic gain control (AGC) amplifier 308 is configured to communicate a gain adjusted, analog input signal to the RF to IF conversion device 310.

The RF to IF conversion device 310 is configured to mix the analog input signal to a preferred IF for conversion to a digital signal at the A/D converter 314. The RF to IF conversion device 310 is also configured to communicate a mixed analog input signal to the anti-alias filter 312. The anti-alias filter 312 is configured to restrict a bandwidth of a mixed analog input signal. The anti-alias filter 312 is also configured to communicate a filtered, analog input signal to the A/D converter 314. The A/D converter 314 is configured to convert a received analog input signal to a digital signal. The A/D converter 314 is also configured to communicate a digital input signal to a second IF translator which is comprised of the real multipliers 316, 318, low pass filters 354,356, and the programmable quadrature digital local oscillator 322.

The multiplier 316 is configured to receive a digital word as input from the A/D converter 314 and a digital word from the in-phase component of the quadrature digital local oscillator 322. The multiplier 316 multiplies the output of the A/D converter 314 by the in-phase component of the quadrature digital local oscillator 322. The multiplier 316 is also configured to communicate a digital output word. The multiplier 318 is configured to receive a digital word as input from the A/D converter 314 and a digital word from the quadrature-phase component of the quadrature digital local oscillator 322. The multiplier 318 multiplies the output of the A/D converter 314 by the quadrature-phase component of the quadrature digital local oscillator 322. The multiplier 318 is also configured to communicate a digital output word.

The low pass filter 354 low pass is generally configured for filtering the baseband output of multiplier 316. The low pass filter 354 is also configured to communicate a digital output word. The low pass filter 356 is generally configured for filtering the baseband output of multiplier 318. The low pass filter 356 is also configured to communicate a digital output word. The output of low pass filters 354, 356 is collectively a quadrature baseband IF signal.

The quadrature digital local oscillator 322 generates a complex quadrature amplitude-and-time-discrete digital sinusoid at a frequency which shall translate the first IF to baseband and remove detected frequency and phase offsets in the resulting quadrature baseband signal. The quadrature digital local oscillator accepts as its inputs a binary phase control word and a binary frequency control word from the loop control circuit 320. Quadrature digital local oscillators are known to those skilled in the art, and therefore will not be described in detail herein.

The IF translator is configured to mix the digital input signal to a preferred IF for processing at the correlator 328 and the digital complex multiplier 324. The IF translator is also configured to communicate a digital input signal to the correlator 328 and the digital complex multiplier 324. As will be appreciated by those skilled in the art, the output of the IF translator can include an in-phase ("I") data and quadrature phase ("Q") data. As such, the IF translator can communicate I and Q data to the correlator 328 and the digital complex multiplier 324.

The digital complex multiplier 324 is configured to perform a complex multiplication in the digital domain. In the complex-valued digital multiplier 324, the digital input signal from the IF translator is multiplied by a digital representation of a chaotic sequence. The chaotic sequence is generated in the chaos generator 340. The chaos generator 340 communicates the chaotic sequence to USQM 342. In this regard, it should be appreciated that the chaos generator 340 is coupled to the receiver controller 338. The receiver controller 338 is configured to control the chaos generator 340 so that the chaos generator 340 generates a chaotic sequence with the correct initial state when the receiver 104 is in an acquisition mode and a tracking mode.

The USQM 342 is configured to transform a digital chaotic sequence into a quadrature form. In particular, USQM 342 converts independent uniformly distributed random variables to a pair of quadrature variables (I, Q values). This transformation is selected so that it is consistent with the transformation performed by the USQM 220 in the transmitter 102. Accordingly, the operation of USQM 342 will not be described here in detail. However, it should be understood that the receiver controller 328 communicates a control signal to USQM 342 for controlling whether USQM 342 operates in the first or second operation mode.

In the first operating mode, the USQM 342 is configured to transform each digital chaotic sequence value to a corresponding quadrature form represented by I and Q values. The sequence of I and Q values are constrained so that they define a vector having a magnitude that advantageously remains constant for each I, Q pair in the sequence. Significantly, however, the phase angle defined by each pair of I, Q values will vary from one quadrature pair to the next such that the sequence of quadrature output values has uniformly distributed phase angles within a predefined range of possible phase angles. Stated differently, it can be said that sequence of I, Q values define a sequence of spreading chips having a constant magnitude but variable phase angle characterized by values which are statistically uniformly distributed continuously within a predefined range.

In the second operating mode, the USQM 342 is configured to cause receiver 104 to demodulate a spread spectrum signal which is not CAZAC, but has a selectively variable PAPR. More particularly, in the second operating mode, the USQM 342 is configured to statistically transform a digital chaotic sequence into a transformed digital chaotic sequence with chosen statistical properties. For example, the USQM 342 may take in two (2) uniformly distributed real inputs from the chaos generator 340 and convert those via a complex-valued bivariate Gaussian transformation to a quadrature output. The quadrature output can be chosen to have selectively variable statistical characteristics. For example, the statistical characteristics can be that of additive white Gaussian noise or a selectively modified version of such Gaussian noise having a truncated range of amplitude distributions.

More particularly, in the second operating mode, the quadrature output of USQM 342 is adaptively controlled so that the magnitude values can be selectively restricted to a reduced or truncated range. The reduced or truncated magnitude range can vary between some maximum statistical range associated with the Gaussian noise, and a minimum range, which is the same or approximately the same as the quadrature output produced USQM 342 in the first operating mode.

The USQM 342 is further configured to communicate transformed chaotic sequences to the re-sampling filter 344. The USQM 342 communicates the quadrature form of the digital chaotic sequence to the re-sampling filter 344. More particularly, the USQM 342 communicates an in-phase ("I") data and quadrature phase ("Q") data to the re-sampling filter 344. Still, embodiments of the present invention are not limited in this regard.

The re-sampling filter 344 is also configured to forward the transformed chaotic sequence to the digital complex multiplier 324. The re-sampling filter 344 is configured as a sample rate change filter for making the chaos sample rate compatible with the received signal sample rate when the receiver 104 is in acquisition mode. The re-sampling filter 344 is also configured to compensate for transmit and receive clock offsets with less than a certain level of distortion when the receiver is in a steady state demodulation mode. In this regard, it should be appreciated that the re-sampling filter 344 is configured to convert a sampling rate of in-phase ("I") and quadrature-phase ("Q") data sequences from a first sampling rate to a second sampling rate without changing the spectrum of the data contained in therein. The re-sampling filter 344 is further configured to communicate in-phase ("I") and quadrature-phase ("Q") data sequences to the digital complex multipliers 324, 352, and the multiplexers 346, 348.

It should be noted that if a sampled form of a chaotic sequence is thought of as discrete samples of a continuous band limited chaos then the re-sampling filter 344 is effectively tracking the discrete time samples, computing a continuous representation of the chaotic sequence, and re-sampling the chaotic sequence at the discrete time points required to match the discrete time points sampled by the A/D converter 314. In effect, input values and output values of the re-sampling filter 344 are not exactly the same because the values are samples of the same waveform taken at slightly offset times. However, the values are samples of the same waveform so the values have the same power spectral density.

Referring again to FIG. 3, the CEADG 350 is configured to generate a modulated acquisition sequence. The CEADG 350 is also configured to communicate a modulated acquisition sequence to the digital complex multiplier 352. The digital complex multiplier 352 is configured to perform a complex multiplication in the digital domain. This complex multiplication includes multiplying a modulated acquisition sequence from the CEADG 350 by a digital representation of a chaotic sequence to yield a reference for a digital input signal. The digital complex multiplier 352 is also configured to communicate the reference signal to the multiplexers 346, 348. The multiplexer 346 is configured to route the quadrature-phase part of a reference signal to the correlator 328. The multiplexer 348 is configured to route the in-phase part of a reference signal to the correlator 328. In this regard, it should be appreciated that the multiplexers 346, 348 are coupled to the receiver controller 338. The receiver controller 338 is configured to control the multiplexers 346, 348 in tandem so that the multiplexers 346, 348 route the reference signal to the correlator 328 while the receiver 104 is in an acquisition mode (described below).

The correlator 328 is configured to correlate a chaotic sequence with a digital input signal. In this regard, it should be understood that, the sense and values of the real and imaginary components of the correlation is directly related to the values of the real and imaginary components of the symbols of a digital input signal. It should also be understood that, in a preferred embodiment, the sense of the real and imaginary components of the correlation is directly related to the values of the real and imaginary components of the PSK symbols of a digital input signal. Thus, when the correlator 328 is in a steady state demodulation mode the output of the correlator 328 is PSK symbol soft decisions. In this regard, it should be appreciated that soft information refers to soft-values (which are represented by soft-decision bits) that comprise information about the bits contained in a sequence. In particular, soft-values are values that represent the probability that a particular bit in a sequence is either a one (1) or a zero (0). For example, a soft-decision for a particular bit can indicate that a probability of a bit being a one (1) is $p(1)=0.3$. Conversely, the same bit can have a probability of being a zero (0) which is $p(0)=0.7$.

The correlator 328 is also configured to communicate PSK soft decisions to the hard decision device 330 for final symbol decision making. The hard decision device 330 is configured to communicate symbol decisions to the S/B converter 332. The S/B converter 332 is configured to convert symbols to a binary form. The S/B converter 332 is configured to communicate a binary data sequence to the source decoder 334. The source decoder 334 is configured to decode FEC applied at the transmitter and to pass the decoded bit stream to one or more external devices (not shown) utilizing the decoded data.

The correlator 328 is also configured to acquire initial timing information associated with a chaotic sequence, initial timing associated with a data sequence and to track phase and frequency offset information between the chaotic sequence and a digital input signal. The correlator 328 is also configured to track input signal magnitude information between the chaotic sequence and a digital input signal. Acquisition of initial timing information and tracking of input signal magnitude, phase and frequency offset information are both standard functions in digital communication systems. As such, methods for acquiring initial timing information and tracking phase and frequency offset information are well known to persons skilled in the art, and therefore will not be described in detail herein. However, it should be appreciated that any such method can be used without limitation.

Referring again to FIG. 3, the correlator 328 is configured to communicate the magnitude and phase information as a function of time to the loop control circuit 320. The loop control circuit 320 uses the magnitude and phase information to calculate the deviation of the input signal magnitude from a nominal range, and phase and frequency offset information to synchronize a chaotic sequence with a digital input signal. The loop control circuit 320 is also configured to communicate the phase and frequency offset information to the quadrature digital local oscillator 322 portion of the IF translator and gain deviation compensation information to the automatic gain control (AGC) amplifier 308. The loop control circuit 320 is further configured to communicate a retiming control signal to the re-sampling filter SRMD 344 and the chaos generator 340.

It should be understood that the digital generation of the digital chaotic sequence at the transmitter 102 and receiver 104 is kept closely coordinated under the control of a precision real time reference clock 336. The higher the precision of the clock 336, the closer the synchronization of the chaos generator 218 of the transmitter 102 and the chaos generator 340 of the receiver 104 shall be excluding the effects of processing delay differences and channel propagation times. It is the use of digital chaos generators 218, 340 that allow the states of the chaos generators to be easily controlled with precision, thus allowing coherent communication.

Referring again to FIG. 3, the precision real time reference clock 336 is a stable local oscillator locked to a precision real time reference, such as a GPS clock receiver or a chip scale atomic clock (CSAC). The precision real time reference clock 336 is configured to supply a high frequency clock to the clocked logic circuits 314, . . . , 356 while being locked to a lower frequency reference clock. The lower frequency reference clock supplies a common reference and a common real time of day reference to prevent a large drift between the states of the chaos generator 218 and the chaos generator 340 of the receiver 104 over an extended time interval.

The operation of the receiver 104 will now be briefly described with regard to an acquisition mode and a steady state demodulation mode.

Acquisition Mode:

In acquisition mode, the re-sampling filter 344 performs a rational rate change and forwards a transformed chaotic sequence to the digital complex multiplier 352. The CEADG 350 generates a modulated acquisition sequence and forwards the same to the digital complex multiplier 352. The digital complex multiplier 352 performs a complex multiplication in the digital domain. In the digital complex multiplier 352, a modulated acquisition sequence from the CEADG 350 is multiplied by a digital representation of a chaotic sequence to yield a reference for a digital input signal that was generated at the transmitter 102 to facilitate initial acquisition. The chaotic sequence is generated in the chaos generator 340. The digital complex multiplier 352 communicates a reference signal to the multiplexers 346, 348. The multiplexers 346, 348 route the reference signal to the correlator 328. The correlator 328 is transitioned into a search mode. In this search mode, the correlator 328 searches across an uncertainty window to locate a received signal state so that the chaos generator 340 can be set with the time synchronized state vector.

Steady State Demodulation Mode:

In steady state demodulation mode, the correlator 328 tracks the correlation between the received modulated signal and the locally generated chaos close to the nominal correlation peak to generate magnitude and phase information as a function of time. This information is passed to the loop control circuit 320. The loop control circuit 320 applies appropriate algorithmic processing to this information to extract phase offset, frequency offset, and magnitude compensation information. The correlator 328 also passes its output information, based on correlation times terminated by symbol boundaries, to the hard decision block 330. The hard decision block 330 compares the correlation information to pre-determined thresholds to make hard symbol decisions. The loop control circuit 320 monitors the output of the correlator 318. When the loop control circuit 320 detects fixed correlation phase offsets, the phase control of the quadrature digital local oscillator 322 is modified to remove the phase offset. When the loop control circuit 320 detects phase offsets that change as a function of time, it adjusts the re-sampling filter 344 which acts as an incommensurate re-sampler when the receiver 104 is in steady state demodulation mode to remove timing offsets or the frequency control of the quadrature digital local oscillator 322 is modified to remove frequency offsets. When the correlator's 328 output indicates that the received digital input signal timing has "drifted" more than plus or minus a half (½) of a sample time relative to a locally generated chaotic sequence, the loop control circuit 320: (1) adjusts a correlation window in an appropriate temporal direction by one sample time; (2) advances or retards a state of the local chaos generator 340 by one iteration state; and (3) adjusts the re-sampling filter 344 to compensate for the time discontinuity. This loop control circuit 320 process keeps the chaos generator 218 of the transmitter 102 and the chaos generator 340 of the receiver 104 synchronized to within half (½) of a sample time. The loop control circuit 320 monitors the magnitude of the output of the correlator 328 to control the AGC amplifier 308. If the expected value of the magnitudes fall below an a priori determined threshold, then the gain is varied in an increasing direction. If the expected value of the magnitudes rises above another a priori determined threshold, then the gain is varied in a decreasing direction.

If a more precise temporal synchronization is required to enhance performance, then a re-sampling filter can be implemented as a member of the class of polyphase fractional time delay filters. This class of filters is well known to persons skilled in the art, and therefore will not be described in great detail herein.

As described above, a number of chaotic samples are combined with an information symbol at the transmitter 102. Since the transmitter 102 and receiver 104 timing are referenced to two (2) different precision real time reference clock 212, 336 oscillators, symbol timing must be recovered at the receiver 104 to facilitate robust demodulation. Symbol timing recovery can include: (1) multiplying a received input signal by a complex conjugate of a locally generated chaotic sequence using the complex multiplier 324; (2) computing an N point running average of the product where N is a number of chaotic samples per symbol time; (3) storing the values, the maximum absolute values of the running averages, and the time of occurrence; and (4) statistically combining the values at the symbol timing recovery circuit 326 to recover symbol timing. It should be noted that symbol timing recover can also be accomplished via an output of the correlator 328. However, additional correlator operations are needed in such a scenario. As should be appreciated, using a separate multiplier operation for this purpose adds additional capabilities to the receiver 104, such as the capability to correlate and post process over multiple correlation windows simultaneously to locate the best statistical fit for symbol timing.

In this steady state demodulation mode, the symbol timing recovery circuit 326 communicates a symbol onset timing to the correlator 328 for controlling an initiation of a symbol correlation. The correlator 328 correlates a locally generated chaotic sequence with a received digital input signal during a symbol duration. In this regard, it should be understood that, the sense and magnitude of a real and imaginary components of the correlation is directly related to the values of the real and imaginary components of symbols of a digital input signal. Accordingly, the correlator 328 generates symbol soft decisions. The correlator 328 communicates the symbol soft decisions to the hard decision device 330 for final symbol decision making. The hard decision device 330 determines symbols using the symbol soft decisions. Thereafter, the hard decision device 330 communicates the symbols to the S/B converter 332. The S/B converter 332 converts the symbol decisions to a binary form. The S/B converter 332 is configured to communicate a binary data sequence to the source decoder 334. The source decoder 334 is configured to decide FEC applied at the transmitter 102 and pass the decoded bit stream to one or more external devices (not shown) utilizing the decoded data.

The receiver controller 338 is configured to coordinate the operation of USQM 342 in the receiver 104 with the operation of USQM 220 in transmitter 102 to provide an adaptive PAPR capability for the communication system. The coordinated operation also ensure that USQM 342 produces a chaotic chipping sequence that is an exact replica of the chaotic chipping sequence produced in USQM 220.

Coordination between the transmitter 102 and receiver 104 can be implemented by control messages communicated between receiver 104 and transmitter 102. For example, transmitter controller 210 can cause one or more control messages to be communicated from transmitter 102 to receiver 104. A second transmitter (not shown, but similar to transmitter 102) can be cooperatively associated with receiver 104. The second transmitter is configured to cause one or more control messages to be communicated to a second receiver (not shown, but similar to receiver 104) at the transmitter 102. In this way, bi-directional communications can be provided.

The adaptive PAPR capability of the invention will now be described in further detail. Measured or estimated mission critical operating parameters are detected at receiver 104. The mission critical operating parameter information is thereafter communicated to transmitter 102 using the bi-directional communications described above. When the mission critical operating parameter information is received at transmitter 102, the transmitter controller 210 uses the mission critical operating parameter information in a control algorithm. The control algorithm is designed to selectively vary the transmitter output waveform when necessary for providing increased operational performance. In particular, the PAPR of the output signal from transmitter 102 can be adapted responsive to changing performance.

As an example, an adaptive anti-jamming application of the invention will now be described in further. A measured or estimated SNR value is detected at receiver 104. The SNR information is thereafter communicated to transmitter 102 using the bi-directional communications described above. When the SNR information is received at transmitter 102, the transmitter controller 210 uses the SNR information in a control algorithm. The control algorithm is designed to selectively vary the transmitter output waveform when necessary for providing increased resistance to jamming. In particular, the PAPR of the output signal from transmitter 102 can be decreased responsive to increasing values of SNR which indicates the presence of jamming. In the absence of jamming, the output signal from transmitter 102 can be a purely chaotic signal that appears to observers as broadband noise. In the presence of severe jamming, the output signal from transmitter 102 can be a CAZAC signal with constant power envelope.

As the PAPR is decreased, the transmitter gain is advantageously increased for maximizing the average power output from the transmitter without transmitter compression.

A person skilled in the art will appreciate that the receiver 104 is one architecture of a communications system receiver. However, the invention is not limited in this regard and any other receiver architecture can be used without limitation.

Chaos Generators and Digital Chaotic Sequence Generation

Figure 4:
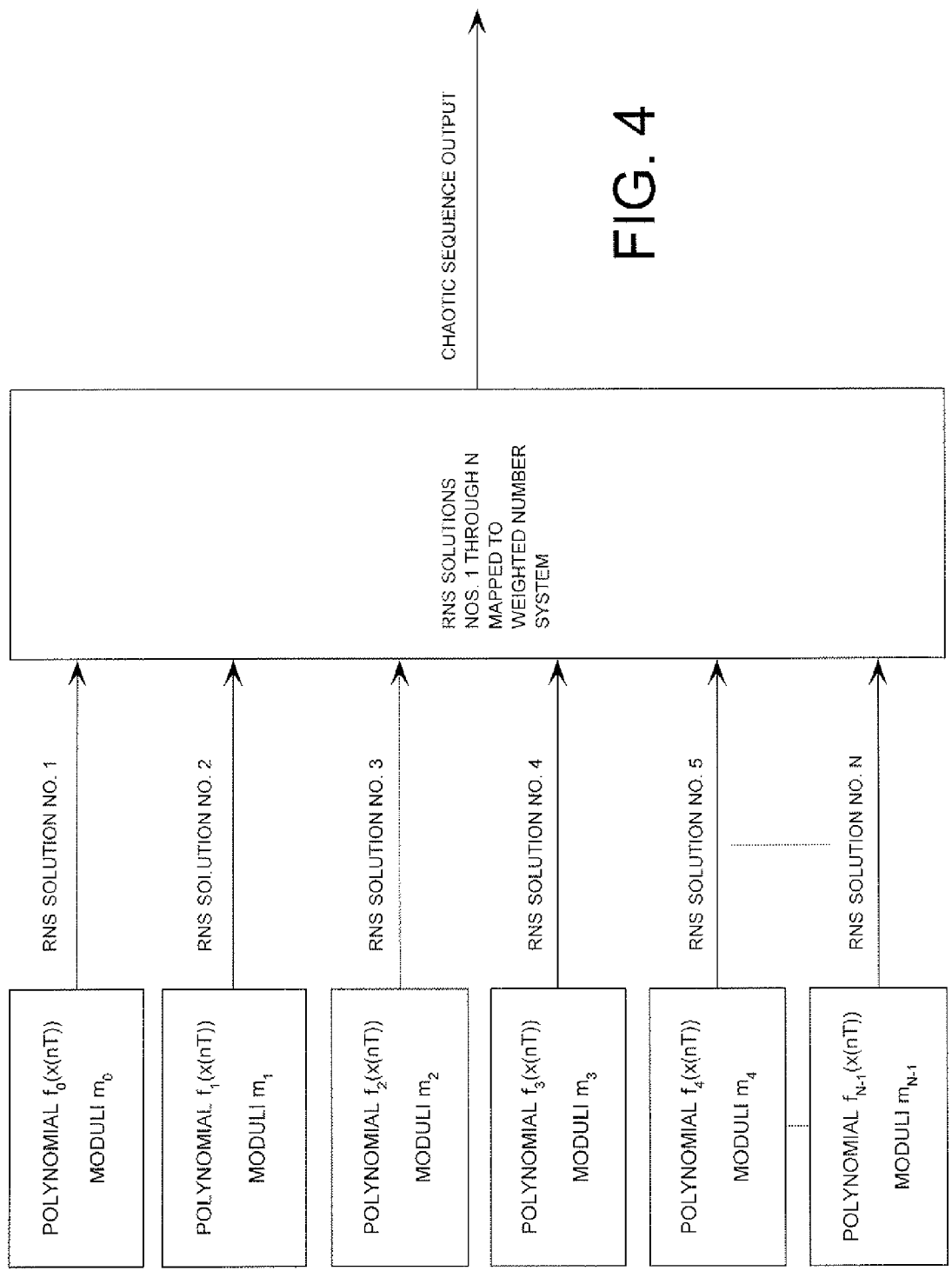
FIG. 4 is a conceptual diagram of the digital chaos generators of FIGS. 2-3 that is useful for understanding the invention.

Referring now to FIG. 4, there is provided a conceptual diagram of a chaos generator 218, 340 (described above in relation to FIGS. 2 and 3) that is useful for understanding the invention. As shown in FIG. 4, generation of the chaotic sequence begins with N polynomial equations $f_0(x(nT))$, ..., $f_{N-1}(x(nT))$. The N polynomial equations $f_0(x(nT))$, ..., $f_{N-1}(x(nT))$ can be selected as the same polynomial equation or as different polynomial equations. According to an aspect of the invention, the N polynomial equations $f_0(x(nT))$, ..., $f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field (f). For example, the polynomial equation $f(x(nT))$ is irreducible if there does not exist two (2) non-constant polynomial equations $g(x(nT))$ and $h(x(nT))$ in $x(nT)$ with rational coefficients such that $f(x(nT))=g(x(nT))\cdot h(x(nT))$.

As will be understood by a person skilled in the art, each of the N polynomial equations $f_0(x(nT))$, ..., $f_{N-1}(x(nT))$ can be solved independently to obtain a respective solution. Each solution can be expressed as a residue number system (RNS) residue value using RNS arithmetic operations, i.e. modulo operations. Modulo operations are well known to persons skilled in the art. Thus, such operations will not be described in great detail herein. However, it should be appreciated that a RNS residue representation for some weighted value "a" can be defined by mathematical Equation (1).

$$R=\{a \text{ modulo } m_0, a \text{ modulo } m_1, \ldots, a \text{ modulo } m_{N-1}\} \quad (1)$$

where R is a RNS residue N-tuple value representing a weighted value "a". Further, R(nT) can be a representation of the RNS solution of a polynomial equation $f(x(nT))$ defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, m_{N-1}$ respectively are the moduli for RNS arithmetic operations applicable to each polynomial equation $f_0(x(nT))$, ..., $f_{N-1}(x(nT))$.

From the foregoing, it will be appreciated that the RNS employed for solving each of the polynomial equations $f_0(x(nT))$, ..., $f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as a RNS residue value uses a different prime number $p_0, p_1, \ldots, p_{N-1}$ as a modulus $m_0, m_1, \ldots, m_{N-1}$.

Those skilled in the art will appreciate that the RNS residue value calculated as a solution to each one of the polynomial equations $f_0(x(nT))$, ..., $f_{N-1}(x(nT))$ will vary depending on the choice of prime numbers $p_0, p_1, \ldots, p_{N-1}$ selected as a modulus $m_0, m_1, \ldots, m_{N-1}$. Moreover, the range of values will depend on the choice of relatively prime numbers $p_0, p_1, \ldots, p_{N-1}$ selected as a modulus $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT))$, ..., $f_{N-1}(x(nT))$ is selected as an irreducible cubic polynomial equation having chaotic properties in Galois field arithmetic. Each of the N polynomial equations $f_0(x(nT))$, ..., $f_{N-1}(x(nT))$ can also be selected to be a constant or varying function of time. The irreducible cubic polynomial equation is defined by a mathematical Equation (2).

$$f(x(nT))=Q(k)x^3(nT)+R(k)x^2(nT)+S(k)x(nT)+C(k,L) \qquad (2)$$

where n is a sample time index value. k is a polynomial time index value. L is a constant component time index value. T is a fixed constant having a value representing a time interval or increment. Q, R, and S are coefficients that define the polynomial equation $f(x(nT))$. C is a coefficient of $x(nT)$ raised to a zero power and is therefore a constant for each polynomial characteristic. In a preferred embodiment, a value of C is selected which empirically is determined to produce an irreducible form of the stated polynomial equation $f(x(nT))$ for a particular prime modulus. For a given polynomial with fixed values for Q, R, and S more than one value of C can exist, each providing a unique iterative sequence. Still, embodiments of the present invention are not limited in this regard.

According to another embodiment of the invention, the N polynomial equations $f_0(x(nT)) \ldots f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x(nT)+3x(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated moduli $m_0, m_1, \ldots, m_{N-1}$ values which produce an irreducible form of the stated polynomial equation $f(x(nT))$ are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |

TABLE 1-continued

| Moduli values $m_0, m_1, \ldots, m_{N-1}$: | Sets of constant values $C_0, C_1, \ldots, C_{N-1}$: |
|---|---|
| 467 | {15, 244, 301, 425} |
| 479 | {233, 352} |
| 491 | {202, 234} |
| 503 | {8, 271} |

Still, embodiments of the present invention are not limited in this regard.

The number of discrete magnitude states (dynamic range) that can be generated with the system shown in FIG. 4 will depend on the quantity of polynomial equations N and the modulus values $m_0, m_1, \ldots, m_{N-1}$ selected for the RNS number systems. In particular, this value can be calculated as the product $M=m_0 \cdot m_1 \cdot m_3 \cdot \ldots \cdot m_{N-1}$.

Referring again to FIG. 4, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular modulus.

According to an embodiment of the invention, each binary sequence representing a residue value has a bit length (BL) defined by a mathematical Equation (3).

$$BL=\text{Ceiling}[\text{Log } 2(m)] \qquad (3)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling[Log 2(3,563,762,191,059,523)]=Ceiling[51.66]=52 bits. Because each polynomial is irreducible, all 3,563,762,191, 059,523 possible values are computed resulting in a sequence repetition time of every M times T seconds, i.e, a sequence repetition time is an interval of time between exact replication of a sequence of generated values. Still, embodiments of the present invention are not limited in this regard.

Referring again to FIG. 4, the RNS solutions Nos. 1 through N are mapped to a weighted number system representation thereby forming a chaotic sequence output. The phrase "weighted number system" as used herein refers to a number system other than a residue number system. Such weighted number systems include, but are not limited to, an integer number system, a binary number system, an octal number system, and a hexadecimal number system.

According to an aspect of the invention, the RNS solutions Nos. 1 through N are mapped to a weighted number system representation by determining a series of digits in the weighted number system based on the RNS solutions Nos. 1 through N. The term "digit" as used herein refers to a symbol or a combination of symbols to represent a number. For example, a digit can be a particular bit of a binary sequence. According to another aspect of the invention, the RNS solutions Nos. 1 through N are mapped to a weighted number system representation by identifying a number in the weighted number system that is defined by the RNS solutions Nos. 1 through N. According to yet another aspect of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

According to an embodiment of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } i \neq 1.\text{" See Id.}$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms x-$a_1$ in its residue code. The quantity x-$a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1},$$

$$a_2 = \left\langle \left\lfloor \frac{x}{m_1} \right\rfloor \right\rangle_{m_2},$$

$$a_3 = \left\langle \left\lfloor \frac{x}{m_1 m_2} \right\rfloor \right\rangle_{m_3}$$

and in general for i>1

$$a_i = \left\langle \left\lfloor \frac{x}{m_1 m_2 \ldots m_{i-1}} \right\rfloor \right\rangle_{m_i},"$$

See Id. From the preceding description it is seen that the mixed-radix conversion process is iterative. The conversion can be modified to yield a truncated result. Still, embodiments of the present invention are not limited in this regard.

According to another embodiment of the invention, a Chinese remainder theorem (CRT) arithmetic operation is used to map the RNS solutions Nos. 1 through N to a weighted number system representation. The CRT arithmetic operation is well known in the art and therefore will not be described here in detail. The first known formulation of the Chinese Remainder Theorem is attributed to Sunzi in his "Book of Arithmetics" circa 500 A.D. However, a brief discussion of how the CRT is applied may be helpful for understanding the invention. The CRT arithmetic operation can be defined by a mathematical Equation (4) [returning to zero (0) based indexing].

$$Y(nT) = \left\{ \begin{array}{c} \langle [3x_0^3(nT) + 3x_0^2(nT) + x_0(nT) + C_0]b_0 \rangle_{p_0} \frac{M}{p_0} + \ldots + \\ \langle [3x_{N-1}^3(nT) + 3x_{N-1}^2(nT) + x_{N-1}(nT) + C_{N-1}]b_{N-1} \rangle_{p_{N-1}} \frac{M}{p_{N-1}} \end{array} \right\}_M \quad (4)$$

Mathematical Equation (4) can be re-written in iterative form as mathematical Equation (5).

$$Y(nT) = \left\{ \begin{array}{c} \langle [3x_0^3((n-1)T) + 3x_0^2((n-1)T) + x_0((n-1)T) + C_0]b_0 \rangle_{p_0} \frac{M}{p_0} + \ldots + \\ \langle [3x_{N-1}^3((n-1)T) + 3x_{N-1}^2((n-1)T) + x_{N-1}((n-1)T) + C_{N-1}]b_{N-1} \rangle_{p_{N-1}} \frac{M}{p_{N-1}} \end{array} \right\}_M \quad (5)$$

where $Y(nT)$ is the result of the CRT arithmetic operation. n is a sample time index value. T is a fixed constant having a value representing a time interval or increment. $x_0$-$x_{N-1}$ are RNS solutions Nos. 1 through N. $p_0, p_1, \ldots, p_{N-1}$ are prime relatively numbers. M is a fixed constant defined by a product of the relatively prime numbers $p_0, p_1, \ldots p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left(\frac{M}{p_j}\right)^{-1} \mathrm{mod}\, p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M−1. Thus, all $b_j$'s can be set equal to one or more non-zero values without loss of the chaotic properties.

As should be appreciated, the chaotic sequence output $Y(nT)$ can be expressed in a binary number system representation. As such, the chaotic sequence output $Y(nT)$ can be represented as a binary sequence. Each bit of the binary sequence has a zero (0) value or a one (1) value. The chaotic sequence output $Y(nT)$ can have a maximum bit length (MBL) defined by a mathematical Equation (6).

$$\mathrm{MBL} = \mathrm{Ceiling}[\mathrm{Log}\,2(M)] \quad (6)$$

where M is the product of the relatively prime numbers $p_0, p_1, p_{N-1}$ selected as moduli $m_0, m_1, \ldots, m_{N-1}$. In this regard, it should be appreciated that M represents a dynamic range of a CRT arithmetic operation. The phrase "dynamic range" as used herein refers to a maximum possible range of outcome values of a CRT arithmetic operation.

According to an embodiment of the invention, M equals three quadrillion five hundred sixty-three trillion seven hundred sixty-two billion one hundred ninety-one million fifty-nine thousand five hundred twenty-three (3,563,762,191,059, 523). By substituting the value of M into Equation (6), the bit length (BL) for a chaotic sequence output $Y(nT)$ expressed in a binary system representation can be calculated as follows: BL=Ceiling/Log 2(3,563,762,191,059,523)=52 bits. As such, the chaotic sequence output $Y(nT)$ is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059, 522), inclusive. Still, embodiments of the present invention are not limited in this regard. For example, chaotic sequence output $Y(nT)$ can be a binary sequence representing a truncated portion of a value between zero (0) and M−1. In such a scenario, the chaotic sequence output $Y(nT)$ can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical Equation (2) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n-1\ ms))=3x^3((n-1)\cdot 1\ ms)+3x^2((n-1)\cdot 1\ ms)+x((n-1)\cdot 1\ ms)+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation $f(x(nT))$, a first solution having a value forty-six (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 5:
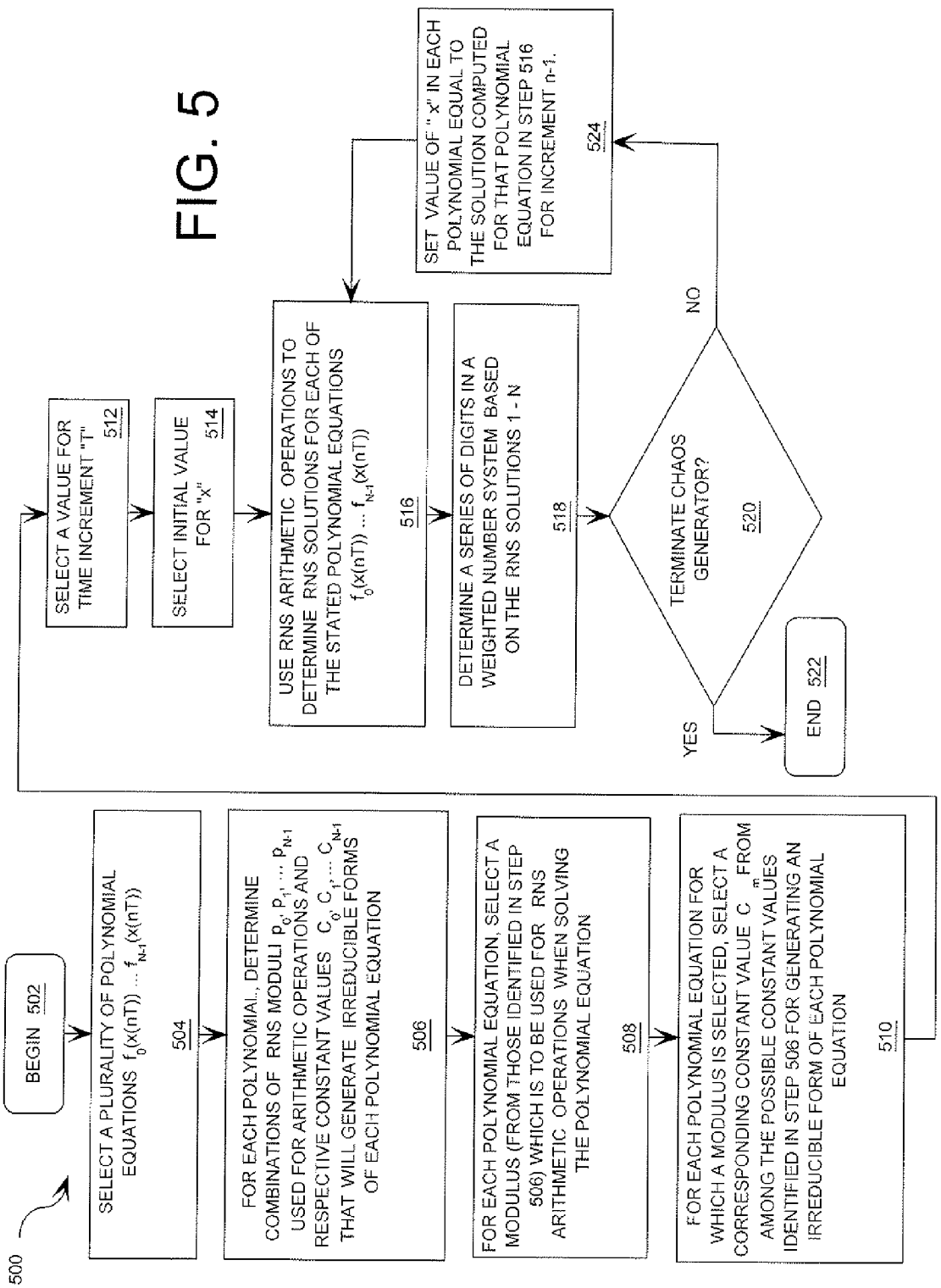
FIG. 5 is a flow diagram of a method for generating a discrete chaotic sequence that is useful for understanding the invention.

Referring now to FIG. 5, there is provided a flow diagram of a method 500 for generating a chaotic sequence that is useful for understanding the invention. As shown in FIG. 5, the method 500 begins with step 502 and continues with step 504. In step 504, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 504, step 506 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 508, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 506. It should also be appreciated that a different modulus must be selected for each polynomial equation $f_0(x(nT)), \ldots, f_{N-1}(x(nT))$.

As shown in FIG. 5, the method 500 continues with a step 510. In step 510, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 506 for generating an irreducible form of the respective polynomial equation $f_0(x(nT)), \ldots, f_{N-1}(x(nT))$.

After step 510, the method 500 continues with step 512. In step 512, a value for time increment "T" is selected. Thereafter, an initial value for "x" is selected. In this regard, it should be appreciated that the initial value for "x" can be any value allowable in a residue ring. Subsequently, step 516 is performed where RNS arithmetic operations are used to iteratively determine RNS solutions for each of the stated polynomial equations $f_0(x(nT)), \ldots, f_{N-1}(x(nT))$. In step 518, a series of digits in a weighted number system are determined based in the RNS solutions. This step can involve performing a mixed radix arithmetic operation or a CRT arithmetic operation using the RNS solutions to obtain a chaotic sequence output.

After step 518, the method 500 continues with a decision step 520. If a chaos generator is not terminated (520:NO), then step 524 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 516. Subsequently, the method 500 returns to step 516. If the chaos generator is terminated (520:YES), then step 522 is performed where the method 500 ends.

A person skilled in the art will appreciate that the method 500 is one architecture of a method for digitally generating a chaotic sequence. However, the invention is not limited in this regard and any other method for generating a chaotic sequence can be used without limitation.

Figure 6:
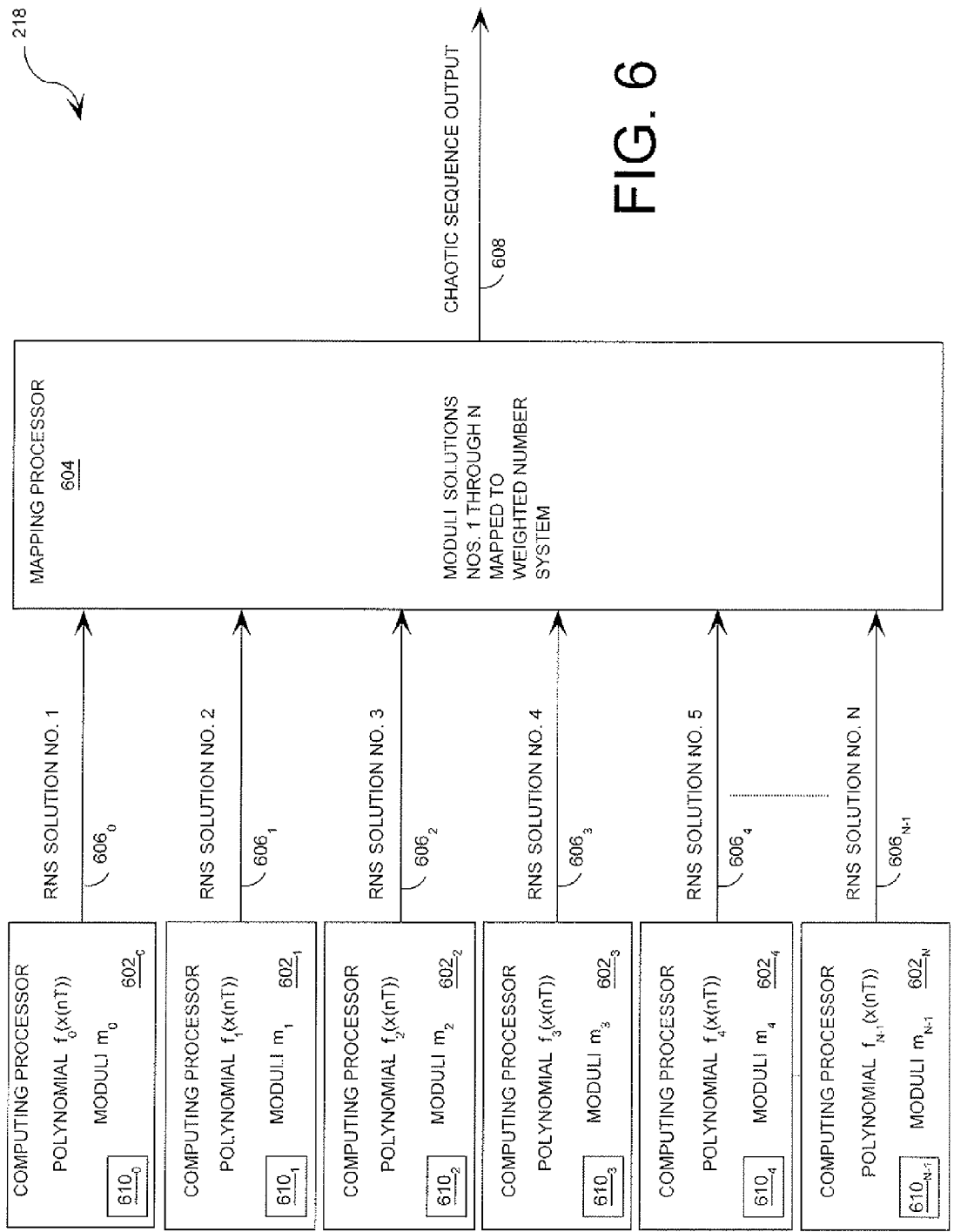
FIG. 6 is a block diagram of the chaos generator of FIG. 2 that is useful for understanding the invention.

Referring now to FIG. 6, there is illustrated one embodiment of a chaos generator 218. The chaos generator 218 is comprised of hardware and/or software configured to generate a digital chaotic sequence. In this regard, it should be appreciated that the chaos generator 218 is comprised of computing processors $602_0$-$602_{N-1}$. The chaos generator 218 is also comprised of a mapping processor 604. Each computing processor $602_0$-$602_{N-1}$ is coupled to the mapping processor 604 by a respective data bus $606_0$-$606_{N-1}$. As such, each computing processor $602_0$-$602_{N-1}$ is configured to communicate data to the mapping processor 604 via a respective data bus $606_0$-$606_{N-1}$. The mapping processor 604 can be coupled to an external device (not shown) via a data bus 608. In this regard, it should be appreciated that the external device (not shown) includes, but is not limited to, a communications device configured to combine or modify a signal in accordance with a chaotic sequence output.

Referring again to FIG. 6, the computing processors $602_0$-$602_{N-1}$ are comprised of hardware and/or software configured to solve N polynomial equations $f_0(x(nT)), \ldots, f_{N-1}(x(nT))$ to obtain a plurality of solutions. The N polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The N polynomial equations $f_0(x(nT)) \ldots f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The N polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $602_0$-$602_{N-1}$ employ modulo operations to calculate a respective solution for each polynomial equation $f_0(x(nT)), \ldots, f_{N-1}(x(nT))$ using modulo based arithmetic operations. Each of the computing processors $602_0$-$602_{N-1}$ are comprised of hardware and/or software configured to utilize a different relatively prime number $p_0, p_1, \ldots, p_{N-1}$ as a modulus $m_0, m_1, \ldots, m_{N-1}$ for modulo based arithmetic operations. The computing processors $602_0$-$602_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $602_0$-$602_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism $610_0$-$610_{N-1}$ are chaotic. In this regard, it should be appreciated that the feedback mechanisms $610_0$-$610_{N-1}$ are provided so that the solutions for each polynomial equation $f_0(x(nT)), \ldots, f_{N-1}(x(nT))$ can be iteratively computed. Accordingly, the feedback mechanisms $610_0$-$610_{N-1}$ are comprised of hardware and/or software configured to selectively define a variable "x" of a polynomial equation as a solution computed in a previous iteration.

Referring again to FIG. 6, the computing processors 602$_0$-602$_{N-1}$ are further comprised of hardware and/or software configured to express each of the RNS residue values in a binary number system representation. In this regard, the computing processors 602$_0$-602$_{N-1}$ can employ an RNS-to-binary conversion method. Such methods are generally known to persons skilled in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, the computing processors 602$_0$-602$_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. On each iteration, the table address is used to initiate the sequence. Still, embodiments of the present invention are not limited in this regard.

Referring again to FIG. 6, the mapping processor 604 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 604 can be comprised of hardware and/or software configured to determine the series of digits in the weighted number system based on the RNS residue values using a Chinese Remainder Theorem process. In this regard, it will be appreciated by those skilled in the art that the mapping processor 604 is comprised of hardware and/or software configured to identify a number in the weighted number system that is defined by the moduli solutions Nos. 1 through N.

According to an aspect of the invention, the mapping processor 604 can be comprised of hardware and/or software configured to identify a truncated portion of a number in the weighted number system that is defined by the moduli solutions Nos. 1 through N. For example, the mapping processor 604 can also be comprised of hardware and/or software configured to select the truncated portion to include any serially arranged set of digits of the number in the weighted number system. Further, the mapping processor 604 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, embodiments of the present invention are not limited in this regard.

Referring again to FIG. 6, the mapping processor 604 is comprised of hardware and/or software configured to express a chaotic sequence in a binary number system representation. In this regard, it should be appreciated that the mapping processor 604 can employ a weighted-to-binary conversion method. Such methods are generally known to persons skilled in the art and therefore will not be described in great detail herein. However, it should be appreciated that any such method can be used without limitation.

A person skilled in the art will appreciate that the digital chaos generator described in relation to FIGS. 1-6 is provided by way of example and is not intended to limit the invention. In this regard, the digital chaos generator described herein is merely one architecture that can be used to implement a digital chaos generator in the various inventive arrangements. Any other digital chaos generator architecture can be used without limitation. Likewise, any other suitable method of generating digital chaos now known, or known in the future can be used to implement the methods of the present invention.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for generating an adaptive PAPR chaotic communication signal, comprising:
    phase modulating a carrier signal with data to form an information signal;
    generating a chaotic spreading sequence based on a chaotic number sequence, said chaotic spreading sequence having a magnitude that is constant and having a variable arbitrary phase angle comprising phase values which are uniformly distributed over a predetermined range of angles;
    forming a spread spectrum signal by multiplying said information signal by said chaotic spreading sequence, said spread spectrum signal having a constant amplitude and a zero autocorrelation;
    detecting current operating conditions of a communication environment; and
    dynamically transforming said spread spectrum signal with a first PAPR to a chaotic signal with a second PAPR having a higher value than the first PAPR, based on said current operating conditions of the communication environment.

2. The method according to claim 1, further comprising selectively modifying said chaotic spreading sequence to induce a pseudorandom or chaotic variation in said magnitude of said chaotic spreading sequence to increase a peak to average power ratio (PAPR) of said spread spectrum signal.

3. The method according to claim 2, further comprising modifying an average deviation of said magnitude of said chaotic spreading sequence to selectively control said PAPR of said spread spectrum signal.

4. The method according to claim 3, further comprising modifying said average deviation responsive to measured or estimated operational parameters, said operational parameters affecting link performance.

5. The method according to claim 1, further comprising selecting said phase values to have a plurality of uniform distributed phase value, where a number of phases is matched to subsequent signal processing to form a continuous distribution over said predetermined range of angles.

6. The method according to claim 1, wherein at least one of said phase values is chaotically varied for each chip of said chaotic spreading sequence.

7. The method according to claim 1, wherein said generating step further comprises:
    selecting a plurality of chaotic polynomial equations;
    using residue number system (RNS) arithmetic operations to respectively determine a plurality of solutions for said plurality of chaotic polynomial equations, said plurality of solutions iteratively computed and expressed as RNS residue values; and determining a chaotic series of digits in a weighted number system based on said plurality of RNS residue values.

8. The method according to claim 1, wherein said information signal, said chaotic spreading sequence and said spread spectrum signal are each digital signals comprised of an in-phase and a quadrature component.

9. The method according to claim 8, further comprising converting said spread spectrum signal from a digital signal to an analog RF spread spectrum signal.

10. The method according to claim 1, further comprising:
digitally generating at a receiver a chaotic de-spreading sequence that is identical to said chaotic spreading sequence;
de-spreading said spread spectrum signal by using said chaotic de-spreading sequence to recover said information signal; and
de-modulating said information signal to recover said data.

11. The method according to claim 10, further comprising synchronizing said chaotic spreading sequence and said chaotic de-spreading sequence.

12. A method for constructing an adaptive communication signal robust in the presence of natural or man-made interference, comprising:
modulating a carrier signal with data to form an information signal;
generating a chaotic spreading sequence based on a chaotic number sequence;
selecting said chaotic spreading sequence to have a pseudo-randomly or chaotically variable magnitude and a chaotically varying arbitrary phase angle including phase values which are band limited and distributed over a predetermined range of angles;
forming a spread spectrum signal by multiplying said information signal by said chaotic spreading sequence, said spread spectrum signal having a peak to average power ratio (PAPR); and
detecting current operating conditions of a communication environment; and
dynamically transforming said spread spectrum signal with a first PAPR to a chaotic signal with a second PAPR having a higher value than the first PAPR, based on said current operating conditions of the communication environment;
wherein said spread spectrum signal is dynamically transformed to said chaotic signal at least by selectively varying an average deviation of said pseudo-randomly or chaotically variable magnitude of said chaotic spreading sequence.

13. The method according to claim 12, wherein said average deviation is modified in response to measured or estimated operational parameters, said operational parameters affecting link performance.

14. The method according to claim 13, wherein said average deviation is decreased as signal interference increases.

15. The method according to claim 12, further comprising dynamically selectively varying a gain of a high power amplifier used for amplifying said spread spectrum signal.

16. The method according to claim 15, further comprising increasing said gain as said PAPR is decreased.

17. A spread spectrum communication system, comprising:
a channel encoder configured to phase modulate a carrier signal with data to form an information signal;
a spreading sequence generator configured to generate a spreading sequence having a phase angle dependent upon a chaotic number sequence and a magnitude which is selectively dependent upon a pseudo-random number or chaotic sequence;
a multiplier configured to form a spread spectrum signal by multiplying said information signal by said spreading sequence;
detecting current operating conditions of a communications environment; and
dynamically transforming said spread spectrum signal with a first PAPR to a chaotic signal with a second PAPR having a higher value than the first PAPR, based on said current operating conditions of said communications environment;
wherein said spreading sequence generator is responsive to a control signal for controlling said selective dependency of said magnitude.

18. The spread spectrum communication system according to claim 17, wherein said phase angle includes phase values which have a band limited uniform distribution over said predetermined range of angles.

19. The spread spectrum communication system according to claim 17, wherein said spreading sequence generator includes a chaos generator configured to digitally generate a chaotic spreading sequence.

20. The spread spectrum communication system according to claim 19, wherein said chaos generator is configured to digitally generate said chaotic spreading sequence by
selecting a plurality of chaotic polynomial equations,
using residue number system (RNS) arithmetic operations to respectively determine a plurality of solutions for said plurality of chaotic polynomial equations, said plurality of solutions iteratively computed and expressed as RNS residue values, and
determining a series of chaotic digits in a weighted number system based on said plurality of RNS residue values.

21. The spread spectrum communication system according to claim 17, wherein said information signal, said spreading sequence and said spread spectrum signal are each digital signals comprised of an in-phase and a quadrature component.

22. The spread spectrum communication system according to claim 17, further comprising:
a digital modulator configured to translate said spread spectrum signal from a first IF frequency to second IF frequency;
a digital-to-analog converter configured to convert said spread spectrum signal to a first analog IF spread spectrum signal; and
an IF to RF translator to convert said first analog IF spread spectrum signal to an analog RF spread spectrum signal suitable for transmission.

23. The spread spectrum communication system according to claim 22, further comprising:
a receiver configured to receive said analog RF spread spectrum signal, convert said analog RF spread spectrum signal to a second analog IF spread spectrum signal, and digitize said second analog IF spread spectrum signal;
a de-spreading sequence generator configured to digitally generate a de-spreading sequence identical to said spreading sequence;
a correlator configured to de-spread said second analog IF spread spectrum signal using said de-spreading sequence to recover said information signal; and a channel decoder configured to de-modulate said information signal to recover said data.

24. A spread spectrum communication system, comprising:
- a channel encoder configured to phase modulate a carrier signal with data to form an information signal;
- a spreading sequence generator configured to generate a spreading sequence having a phase angle dependent upon a chaotic number sequence and a magnitude which is selectively dependent upon a pseudo-random number or chaotic sequence, said spreading sequence generator responsive to a control signal for controlling said selective dependency of said magnitude; and
- a multiplier configured to form a spread spectrum signal by multiplying said information signal by said spreading sequence;
- a digital modulator configured to translate said spread spectrum signal from a first IF frequency to second IF frequency;
- a digital-to-analog converter configured to convert said spread spectrum signal to a first analog IF spread spectrum signal;
- an IF to RF translator configured to convert said first analog IF spread spectrum signal to an analog RF spread spectrum signal suitable for transmission;
- a receiver configured to receive said analog RF spread spectrum signal, convert said analog RF spread spectrum signal to a second analog IF spread spectrum signal, and digitize said second analog IF spread spectrum signal;
- a de-spreading sequence generator configured to digitally generate a de-spreading sequence identical to said spreading sequence;
- a correlator configured to de-spread said second analog IF spread spectrum signal using said de-spreading sequence to recover said information signal;
- a channel decoder configured to de-modulate said information signal to recover said data; and
- at least one digital data synchronizer at said receiver configured to utilize a predetermined set of acquisition data for synchronizing said de-spreading sequence with said spreading sequence.

25. The spread spectrum communication system according to claim 17, wherein said spreading sequence generator is configured to (a) cause a pseudo-random or chaotic variation in said magnitude, and (b) selectively vary an average deviation of said magnitude of said spreading sequence in response to a magnitude control signal.

26. The spread spectrum communication system according to claim 25, further comprising a transmitter controller configured to generate said magnitude control signal and to cause said average deviation of said magnitude of said spreading sequence to vary in response to a measured or estimated system performance.

27. The spread spectrum communication system according to claim 17, further comprising a high power amplifier configured to amplify said spread spectrum signal, said high power amplifier responsive to an HPA control signal for selectively varying a gain of said high power amplifier as an average deviation of said magnitude is varied.

28. The spread spectrum communication system according to claim 17, wherein said spreading sequence generator is responsive to a control signal to selectively cause said spreading sequence to have a constant magnitude for generating a constant amplitude, zero autocorrelation spread spectrum signal.

29. A spread spectrum communication system, comprising:
- a channel encoder configured to modulate a carrier signal with data to form an information signal;
- a spreading sequence generator configured to generate a spreading sequence having a constant magnitude and an arbitrary phase angle dependent upon a chaotic number sequence and distributed over a predetermined range of angles; and
- a multiplier configured to form a spread spectrum signal by multiplying said information signal by said spreading sequence, said spread spectrum signal being a constant amplitude, zero autocorrelation spread spectrum signal;
- detecting current operating conditions of a communications environment; and
- dynamically transforming said spread spectrum signal with a first PAPR to a chaotic signal with a second PAPR having a higher value than the first PAPR, based on said current operating conditions of the communication environment.

* * * * *